Figure 1:
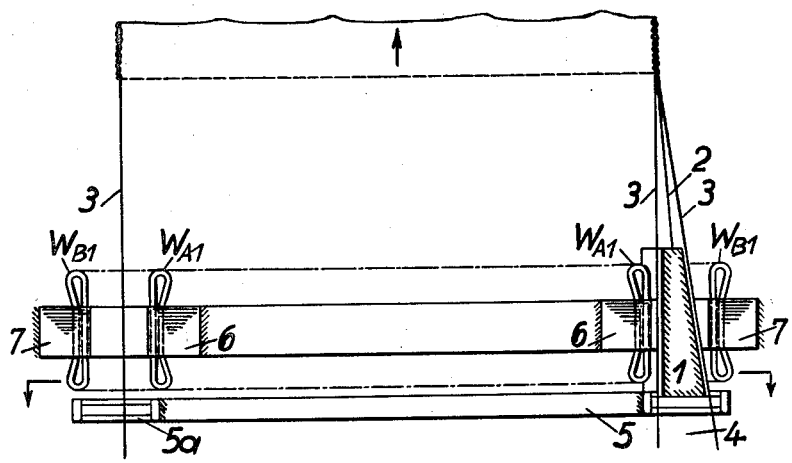

Jan. 20, 1959     H. ROSENBERG ET AL     2,870,349
ELECTROMAGNETIC DRIVE FOR BODIES TO BE MOVED IN PREGIVEN
PATHS, ESPECIALLY SHUTTLES OF CIRCULAR LOOMS
Filed Jan. 17, 1955     10 Sheets-Sheet 1

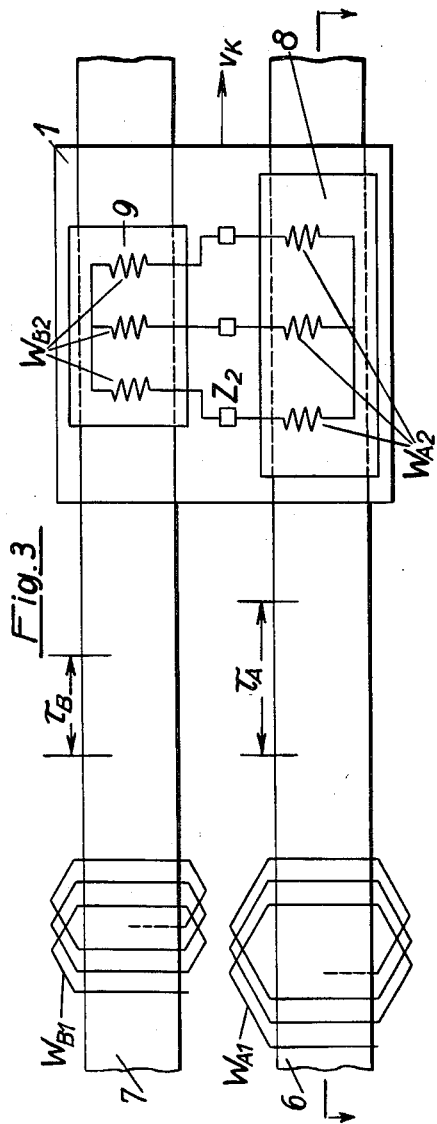
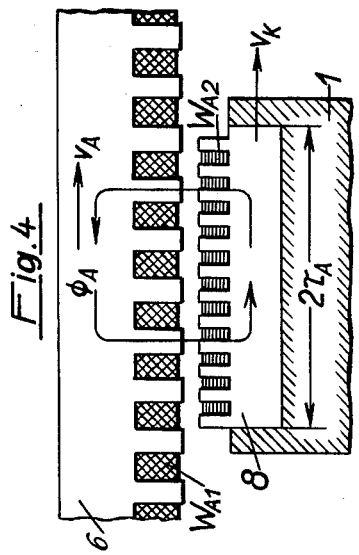
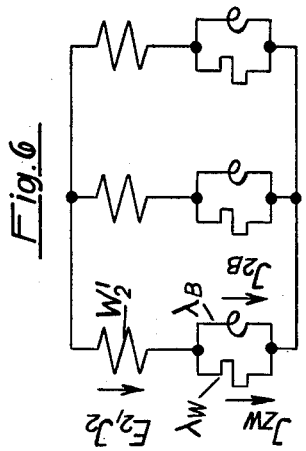

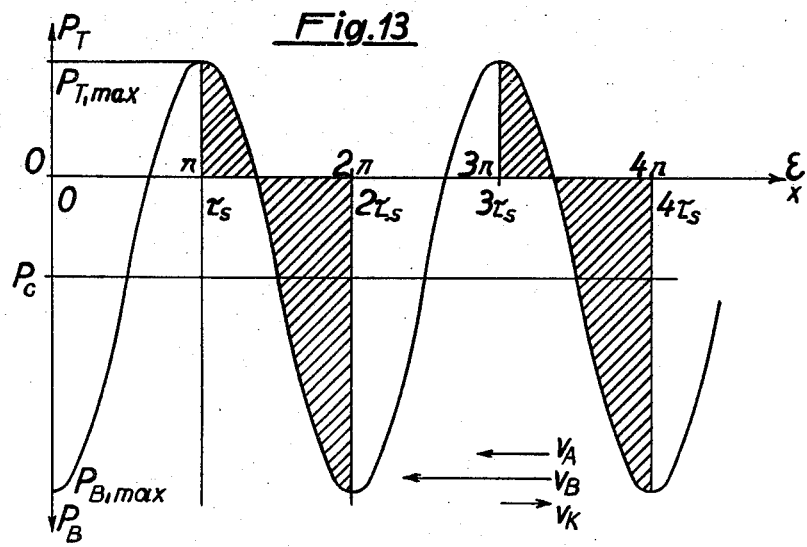
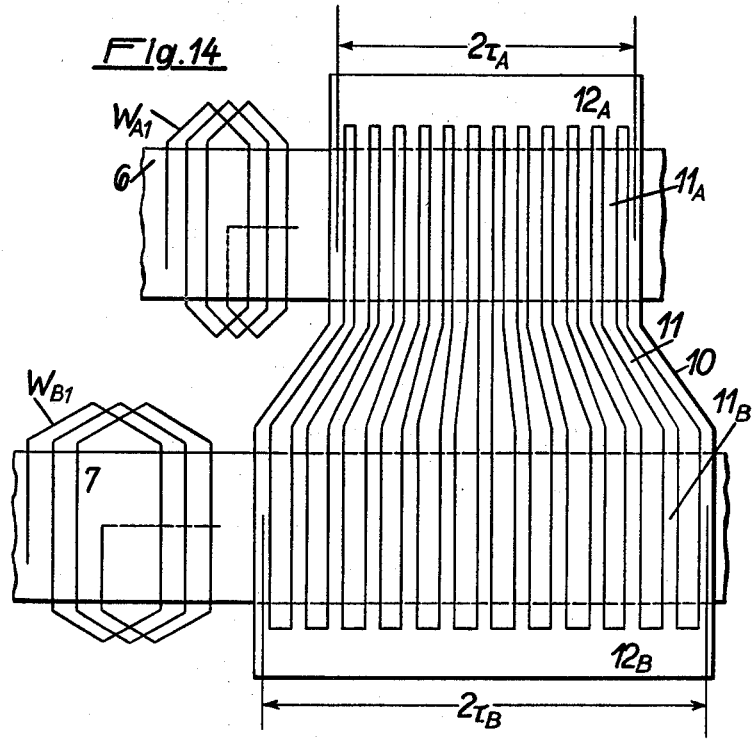

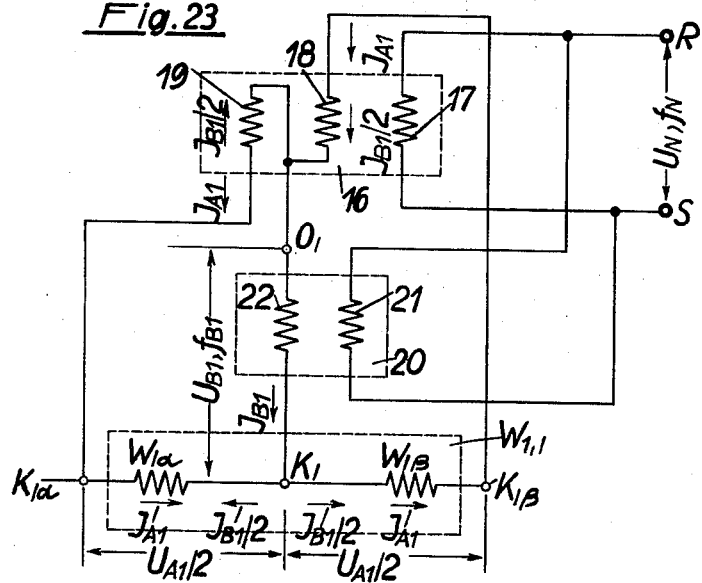
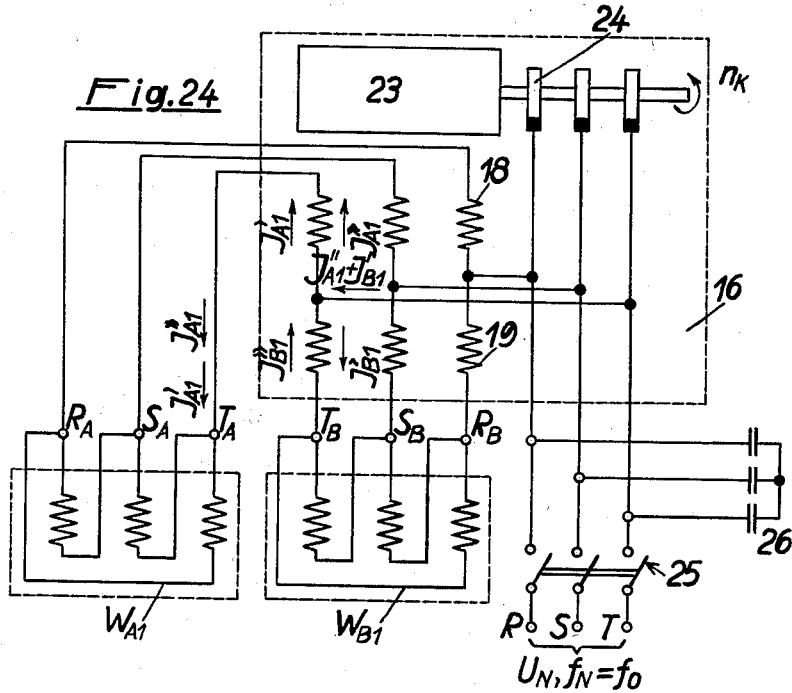

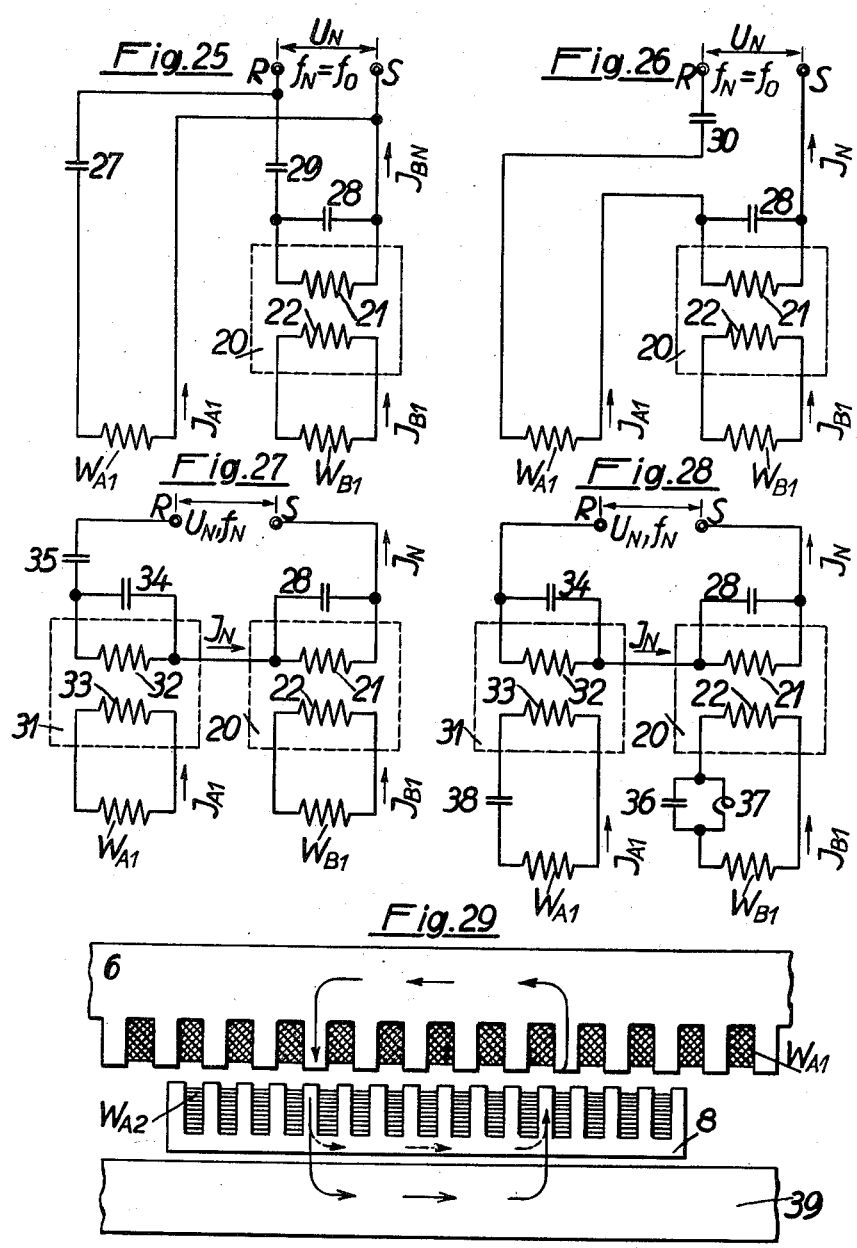

Jan. 20, 1959     H. ROSENBERG ET AL     2,870,349
ELECTROMAGNETIC DRIVE FOR BODIES TO BE MOVED IN PREGIVEN
PATHS, ESPECIALLY SHUTTLES OF CIRCULAR LOOMS
Filed Jan. 17, 1955     10 Sheets-Sheet 10
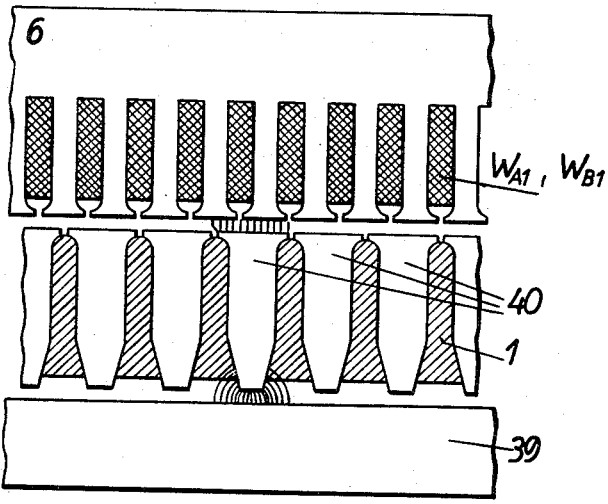
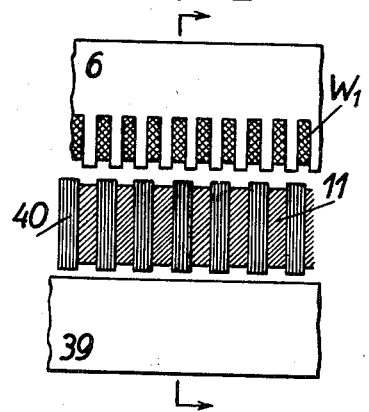
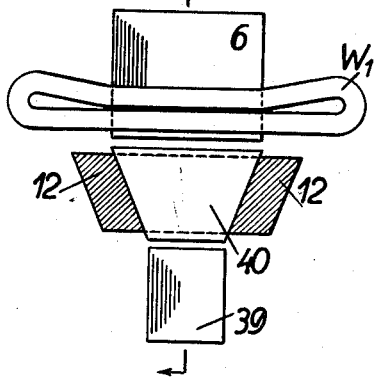
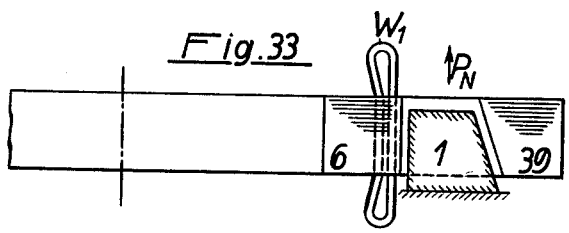

United States Patent Office 2,870,349
Patented Jan. 20, 1959

2,870,349

ELECTROMAGNETIC DRIVE FOR BODIES TO BE MOVED IN PREGIVEN PATHS, ESPECIALLY SHUTTLES OF CIRCULAR LOOMS

Heinz Rosenberg and Heinrich Deschmann, Vienna, Austria, assignors to Osterreichische Textilmaschinenfabrik G. Josephy's Erben, Huttengelande, Linz (Danube), Upper Austria, Austria, a corporation of Austria Application January 17, 1955, Serial No. 482,328

Claims priority, application Austria January 19, 1954

17 Claims. (Cl. 310—13)

The invention relates to a drive effected by forces produced electro-magnetically for bodies (machine parts) which are present singly or multiply in a machine plant, the movement of these bodies should run with the pregiven movement of a certain reference system synchronously. An important example of the use of such a drive is given, for example, in the circular loom, in which the bodies to be driven are the so-called shuttles, which rotate along a circular path. The pregiven, moved reference system in this case is to be imagined connected with the rotating shed formation. There is imposed as condition on the movement of the shuttle that it remains inside the shed in all states of operation, that is during the starting, operations, conclusion or of the braking. As each shuttle is surrounded on all sides by warp threads or reed plates and moves relatively to them, it is impossible to produce its movement by mechanical connection with driving parts, which are situated outside the shed.

The use of magnetic or electro-magnetic couplings acting through the warp threads and situated between the driving elements and the shuttles has been attempted many times, for example in the circular loom of Herold (German Patents 98,623, 98,336), in which electro-magnets rotating inside the loom and excited by direct current exercise attracting forces on iron rollers disposed on each shuttle, the components of which, being tangent to the path, bring the shuttles in synchronous running with the rotating shed formation and in the circular loom of Ancet, which operates with a similar magnetic driving coupling, in which case, however, each shuttle itself is constructed as a roller rolling on a concentric annular path and operatively connected to the associated magnets.

All known coupling drives, however, are affected, in addition to other defects, by the unavoidable disadvantage that the driving parts rotating outside the shed have considerable masses which has a very disadvantageous effect in the case of the necessary speeds of rotation, more especially at the braking in the case of interruption.

Therefore it was also already attempted to change from the electro-magnetic coupling to electro-magnetic drive, which was effected by a stationary part of the loom. In so doing it was obvious to produce the driving and the braking forces in the same manner as in the case of asynchronous motors by asynchronous travelling or rotary fields, which are excited by a multi-phase wound stator and to produce secondary currents in the correspondingly constructed parts of the shuttle. As however the respective travelling fields, in order to produce any force effects in the direction of the path of the shuttle, must move asynchronously to the shuttles, still not any synchronism of the shuttles between themselves and with the shed formation is not effected with such a drive. In order to attain this indispensable synchronization, the multi-phase winding of the stator of a circular loom, according to a proposal by Jehle (German Patent 562,277), for example, should be fed through a commutator with brushes rotating synchronously to the shed formation in such a manner that on the circumference of the stator there are developed zones, which border on each other and synchronously advanced, with alternatively leading (driving) and counter-running (braking) travelling fields, in order thus to bind the shuttles on to these borders of the zone, that is on the synchronism. This drive leads to difficulties in respect to the commutation and also results in too great delays in the reconstruction of the reversed field components.

The drive according to the invention is characterized by the feature that a primary part is provided, which produces a total field having at least two elementary travelling fields and that on each of the bodies to be moved relatively to a component part of this primary part current paths are disposed which are commonly influenced by these travelling fields at least partly, whereby those values corresponding to the velocity to be maintained of the moved body or bodies are imparted to the absolute frequencies of the travelling fields, which values give for the frequencies of the currents induced in its or their current paths equal absolute amounts at least in groups. Then on the body or bodies to be moved forces are effective in all states of operation, that is also at standstill, which are to keep the body or bodies in its or their pregiven path in a certain relative position or tend to bring it into this and are correspondingly to be synchronizing forces. If, especially in the claims only one moved body is spoken of, this is done only for the reasons of simpler method of expression, so that in this also the case of several moved bodies should be included. As elementary field in the sense of this specification any periodic, magnetic field is to be regarded, which advances with constant velocity and retains unaltered frequency and amplitude, as long as an alteration of these constant magnitudes is not caused by actions from outside. Travelling fields, which are produced in windings which are differently fed, superposed or particularly also combined and which have different amplitudes, for example locally or time modulated, are always to be understood as composed of components corresponding to the definition. The frequencies with reference to a stationary system are consistently termed absolute frequencies. The totality of all parts not disposed on the moved body or not firmly connected with it, which serves for the production and conducting of the elementary travelling field effecting the drive, such as, for example winding elements and iron parts, is called primary part. Such a primary part can be built up of mechanical components, which are if necessary separated from each other in respect to their action and which can especially be moved in some cases also jointly or against each other. A feature of the invention lies further in the variability of the absolute frequencies of the travelling fields. By means of this medium the path velocity of the moved bodies may be regulated or adjusted.

An electro-magnetic drive for the production of a to-and-fro movement is known, for example in slot-drilling machines. In this case elementary travelling fields act on a moved body without, however, inducing in it currents with equal frequencies (slip frequencies) with each other at least according to the amount. Therefore no synchronizing forces occur even in this drive. One can therefore impart in this way impulses to a body alternating from both sides, but it is not possible ever to achieve a synchronous binding to the pregiven movement of a point.

In the following the drive according to the invention is explained firstly under the simplifying assumption of only two effective elementary travelling fields of different frequency, which run separated spatially and are excited by stationary, primary winding elements. Accordingly individual, primary winding elements are disposed on each travelling field which are each combined to form one multi-phase winding of conventional construction, each winding being fed with an individual frequency. The example of a circular loom is often the basis of these explanations.

Figure 2:
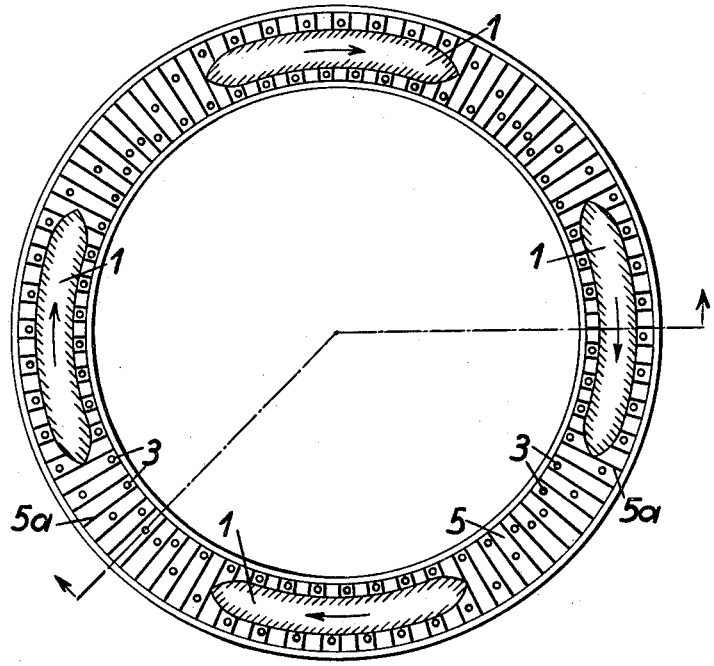
Figure 5:
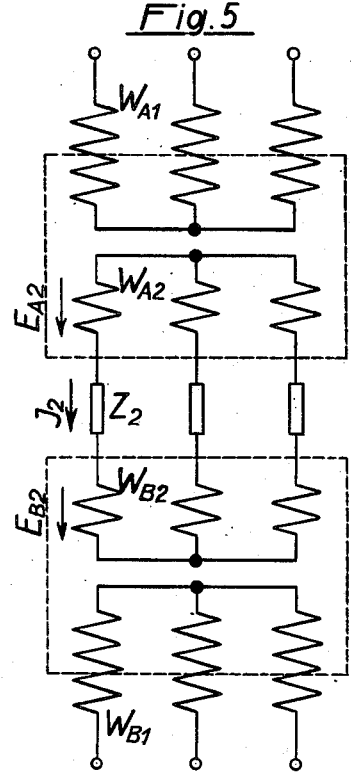
Figure 7:
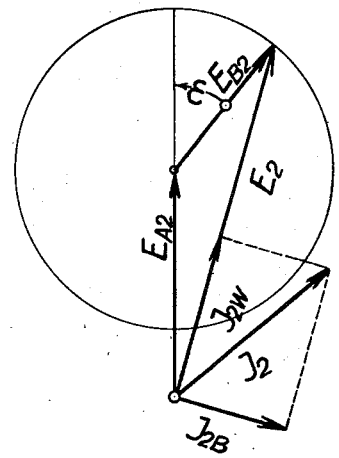
Figure 8:
Figure 9:
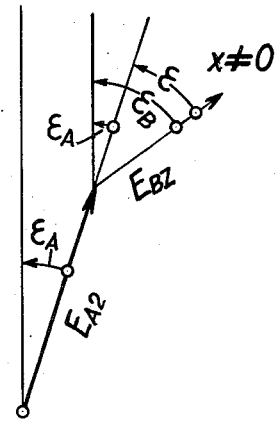
Figure 16:
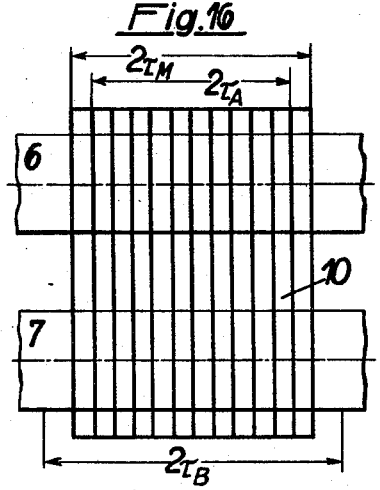
Figure 17:
Figure 18:
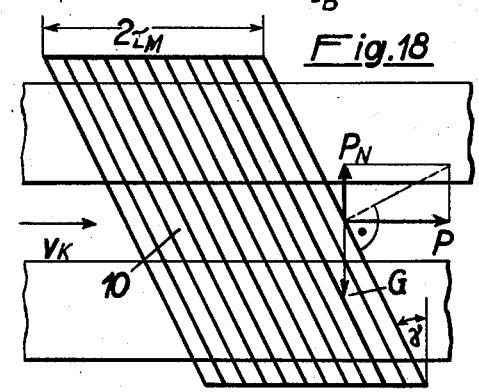
Figure 19:
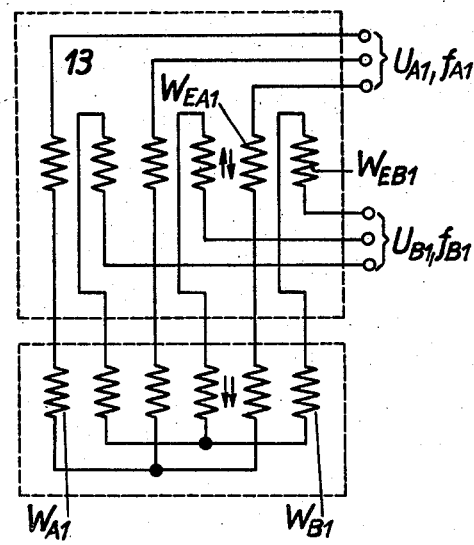
Figure 20:
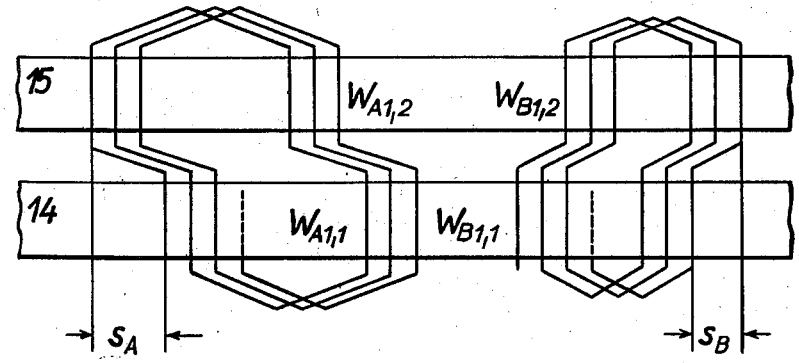

The drawing shows in the Figures 1 and 2 diagrammatically the arrangement of those parts of a circular loom which are important for the drive of the shuttles, in the Figures 3, 4, also diagrammatically, an example of the arrangement of the iron bodies and windings of the drive according to the invention, in Figure 5 a fundamental circuit of the windings of the drive and their magnetic coupling, in Figure 6 a substitute circuit diagram for the common current paths on the moved body, in the Figures 7, 8, 9 vector diagrams of the secondary electro-motive forces and currents induced in these paths, in the Figures 10 to 13 examples for the curve of the forces being tangent to the path and acting on the moved bodies, in the Figures 14, 15, 16, 18 examples of the construction of the common current paths on the moved body as short-circuit cage, in Figure 17 a vector diagram of the secondary electro-motive forces to Figure 16, in the Figures 19 and 20 examples of circuits and arrangements for the uncoupling of superposed primary windings, in the Figures 21 to 24 the derivation and representation of circuits for combined and manifoldly fed primary windings, in the Figures 25 to 28 circuits for the compensation of leakage voltage drops for the transformer series connection of frequency-foreign primary windings and for the attainment of a desired dependence of frequency of the travelling fields effecting the drive, and finally in the Figures 29 to 33 examples of the arrangement and construction of the iron parts conducting the travelling fields for the purpose of influencing the magnetic attractive forces normal on the paths.

In the circular loom according to Figures 1 and 2 the primary winding $W_{A1}$ is, for example, disposed on the riveted outer side of an annular, laminated stator body 6, which is disposed concentrically to the reed 5 in the loom, whereas the primary winding $W_{B1}$ is situated on the riveted inner annular laminated stator body 7, which surrounds concentrically the loom. Of course two or more stators can be situated one above the other or can be combined to form one single, for example, multi-wound iron body.

The driven bodies are the so-called shuttles 1, each of which rotates inside its shed 4 formed by the warp threads 3 on a circular path and supplies a weft thread 2. The warp threads 3 do not themselves rotate. The virtual rotation of the hollow spaces (sheds) enclosed by them is on the contrary, attained by the continuous alteration of the radial position of the warp threads, which is effected by the loom parts (not shown). At this continuous change of position the warp threads are conducted in the radial laminations 5a of the annular so-called blade or reed 5. Figure 3 shows, represented one above the other, the developments of the two stators 6 and 7 in view of their wound surfaces, the windings $W_{A1}$ and $W_{B1}$, which in the case of the circular loom, of course, extend over the whole circumference of the stators, being indicated diagrammatically for the sake of clarity only in a part of the wound surface. The winding $W_{A1}$ is laid out with the pole pitch $\tau_A$ and is fed multiphase with the frequency $f_A$ and accordingly produces a primary field excitation (through flowing) $\theta_{A1}$ distributed substantially spatially sinusoidly, which travels along the circumference of the stator with the absolute velocity of $$V_A = 2\tau_A f_A \quad (1A)$$

Here and in the following the sign of a frequency is formally put equal to the sign of the direction of movement of the relevant travelling field—this applies also for relative movements—the positive direction of movement being selected once optionally and then to be retained. Thus according to the assumption there applies $$\text{sign. } f = \text{sign. } v \quad (2)$$

(exchange of two phases of $W_{A1}$, that is reversal of the direction of rotation of the travelling field is expressed according to (1A) and (2) by change of sign of the feeding frequency $f_A$. This determination is often made in the theoretical treatment of multi-phase systems). The body to be driven (for example shuttle) carries a laminated, for example also riveted iron body 8 with the winding $W_{A2}$, which constitutes a magnetic return path for the useful travelling field $\phi_A$ coupled to the windings $W_{A1}$ and $W_{A2}$, as can be seen from Fig. 4. It is of advantage to select the longitudinal extent of the iron body 8 as well as of its winding equal to $2\tau_A$ (or an integral multiple thereof) in order to avoid disturbing pulsations of the field $\phi_A$. This useful field, as in the case of every asynchronous machine, is produced by the cooperation of the primary and secondary field excitations $\theta_{A1}$ and $\theta_{A2}$ (the travelling field excited by $\theta_{A1}$ alone outside the winding $W_{A2}$ is as leakage field not participating in the drive). The useful travelling fields are thus produced it is true by the respective primary windings (in the casual sense), but in the case of secondary current flow are not produced or excited by them alone. The velocity of these field excitations or of the travelling field $\theta_A$ relative to the moved body 1 is $(v_A - v_K)$ and therefore the frequency of the secondary E. M. F. $E_{A2}$ induced in the winding $W_{A2}$ (slip frequency) is $$f_{A2} = \frac{V_A - V_K}{2\tau_A} \quad (3A)$$

the sign of $f_{A2}$ being given by the sign of $(v_A - v_K)$. Similarly the primary winding $W_{B1}$ laid out with the pole graduation $\tau_B$ and fed with the frequency $f_B$ produces a field excitation $\theta_{B1}$ progressing along the circumference of the stator with the absolute velocity of $$V_B = 2\tau_B f_B \quad (1B)$$

The moved body 1 also carries a laminated core 9 situated opposite to the wound surface of 6, which is provided with the winding $W_{B2}$ (interlinked by the useful travelling field $\phi_B$ with the primary winding $W_{B1}$). The frequency of the secondary E. M. F. $E_{B2}$ induced in $W_{B2}$ is $$f_{B2} = \frac{V_B - V_K}{2\tau_B} \quad (3B)$$

In this specification current paths are called jointly influenced by several travelling fields if secondary currents produced by one of the travelling fields produce force effects in the direction tangent to the path at least partially also with the other travelling fields. Such common current paths result, for example by series connection of current path elements (for example winding loops, coils, conductors), which experience an induction effect from the travelling fields. The series connected current path elements then conduct the same currents or current components ($J_2$), which therefore with each single travelling field give force effects tangent to the path. Since, corresponding to the above determination of the terms, commonly influenced current paths in regard to their effectiveness according to the definition can be reduced or converted to such series connections, the following explanation of the method of working of the drive according to the invention can be restricted to examples with such series connected—in some cases identical—current path elements on the moved body.

Now the simplest are the secondary windings shown only diagrammatically in Figure 3 (here for example, three phase) directly series connected (in the case of multi-phase construction the single loops in phase sequence in the same direction, which depends on the sign of the slip frequencies) and either directly short-circuited or close through outer impedance $Z_2$. The selected series connection results in common current paths for the secondary currents induced by the two fields, that is the two secondary windings conduct the common current $J_2$ as shown in Figure 5 (fundamental circuit of all windings and magnetic coupling conditions, the latter being indicated by dot-dash line frame). As will be proved later, at those velocities $v_K$ of the moved body, at which the two slip frequencies of $f_{A2}$ and $f_{B2}$ in amount are equally large, there applies $$|f_{A2}|=|f_{B2}| \qquad (4)$$

there results by this means a force action of the two asynchronous fields $\phi_A$ and $\phi_B$ on the body 1, which is directed to maintain the respective velocity value $v_K$ and therefore to synchronize.

In general there are for each pair of frequencies $f_{A2}$, $f_{B2}$ two such synchronous velocities $v_K$, according to whether the two slip frequencies $f_{A2}$ and $f_{B2}$ equal in size have the same sign or different sign, that is according to whether the two travelling fields move in the same or counter direction relatively to the moved body.

For $$f_{B2}=f_{A2} \qquad (5)$$

there follows from the Equations 1A, 1B, 3A, 3B and 5

$$V_K = 2 \cdot \frac{f_A - f_B}{\frac{1}{\tau_A} - \frac{1}{\tau_B}} \qquad (6)$$

and $$f_{B2}=f_{A2}=\frac{\frac{f_B}{\tau_A}-\frac{f_A}{\tau_B}}{\frac{1}{\tau_A}-\frac{1}{\tau_B}} \qquad (7)$$

for $$f_{B2}=-f_{A2} \qquad (8)$$

is $$V_K = 2 \cdot \frac{f_A + f_B}{\frac{1}{\tau_A} + \frac{1}{\tau_B}} \qquad (9)$$

and $$f_{B2}=-f_{A2}=\frac{\frac{f_B}{\tau_A}-\frac{f_A}{\tau_B}}{\frac{1}{\tau_A}+\frac{1}{\tau_B}} \qquad (10)$$

The Equations 6 and 9 and 7 and 10 respectively related to the two variants according to 5 and 8 respectively can be formally combined to $$V_K = 2 \cdot \frac{f_A - \frac{f_{A2}}{f_{B2}} \cdot f_B}{\frac{1}{\tau_A} - \frac{f_{A2}}{f_{B2}} \cdot \frac{1}{\tau_B}} \qquad (11)$$

and $$f_{B2}=\frac{\frac{f_B}{\tau_A}-\frac{f_A}{\tau_B}}{\frac{1}{\tau_A}-\frac{f_{A2}}{f_{B2}} \cdot \frac{1}{\tau_B}} \qquad (12)$$

At the series connection of the two secondary windings the electro-motive forces, according to Equation 4 of equal frequency (with the effective values $E_{A2}$ and $E_{B2}$) add up, as shown in Fig. 7, in all winding loops in the same manner vectorially to give a sum E. M. F. $E_2$, which produces the common current $J_2$. This current produces with each of the two part electro-motive forces $E_{A2}$ and $E_{B2}$ a real power $N_{A2}$ and $N_{B2}$ respectively, which is thus taken from the respective winding (positive force) or supplied to it (negative power). The angle $\epsilon$ of the time phase displacement (Fig. 7), between the electro-motive forces $E_{B2}$ and $E_{A2}$ of a loop depends on the position of the windings, that is also of the moved body, to the synchronous reference system moving with the body. The starting position is that, in which $E_{A2}$ and $E_{B2}$ are of the same phase, that is $\epsilon=0$ (Fig. 8). Now, if the moved body is displaced in relation to this synchronous initial position by the relative path length $x$ (counted positively in the positive direction of movement), the vectors $E_{A2}$ and $E_{B2}$, respectively time phase displacements of the absolute amount.

$$|\epsilon_A|=\frac{\pi}{\tau_A} \cdot |x| \qquad (13A)$$

respectively $$|\epsilon_B|=\frac{\pi}{\tau_B} \cdot |x| \qquad (13B)$$

The sign of each of these phase angles (in the sense of a time lag compared with the initial position counted positively) is given from the sign of $x$ and that of the respective slip velocity or slip frequency. If the two signs are positive, so is also that of the phase angle. Thus is $$\epsilon_A = \text{sign } f_{A2} \cdot \frac{\pi}{\tau_A} \cdot x \qquad (14A)$$

and $$\epsilon_B = \text{sign } f_{B2} \cdot \frac{\pi}{\tau_B} \cdot x \qquad (14B)$$

The relative lag angle of $E_{A2}$ thus is $$\epsilon = \epsilon_B - \epsilon_A = \pi \cdot x \cdot \left[ \text{sign } f_{B2} \cdot \frac{1}{\tau_B} - \text{sign } f_{A2} \cdot \frac{1}{\tau_A} \right]$$

or after taking into consideration the Equations 5 and 8

$$\epsilon = -\text{sign } f_{A2} \cdot \pi x \left[ \frac{1}{\tau_A} - \frac{f_{A2}}{f_{B2}} \cdot \frac{1}{\tau_B} \right] \qquad (15)$$

If the relative displacement $x$ of the moved body in relation to the synchronous initial position passes through the range 0 to $$\frac{2}{\frac{1}{\tau_A}-[f_{A2}/f_{B2}] \cdot \frac{1}{\tau_B}}$$

then $|\epsilon|$ passes through the range 0 to $2\pi$, that is the range of all possible relative positions from $E_{B2}$ to $E_{A2}$. Therefore the magnitude $$\tau_s = \frac{1}{\frac{1}{\tau_A}-\frac{f_{A2}}{f_{B2}} \cdot \frac{1}{\tau_B}} \qquad (16)$$

be understood as "synchronizing pole pitch," for a relative displacement $2\tau_s$ in relation to the reference system— as in synchronous machine—can include the whole cycle of all possible force effects.

Magnitude and sign of $\tau_s$ depend only on the winding pole pitches $\tau_A$ and $\tau_B$ as well as on whether the drive according to the invention operates according to Equation 5 or according to Equation 8. There follows from the Equations 15 and 16

$$\epsilon = -\text{sign } f_{A2} \cdot \frac{\pi}{\tau_s} \cdot x \qquad (17)$$

also after insertion of a formal "synchronizing frequency"

$$f_s = f_A - \frac{f_{A2}}{f_{B2}} f_B \qquad (18)$$

while taking into consideration Equation 16 from the Equations 11 and 12

$$V_K = 2\tau_s f_s \qquad (19)$$

and $$f_{B2}=\left(\frac{f_B}{\tau_A}-\frac{f_A}{\tau_B}\right) \cdot \tau_s \qquad (20)$$

For the two series connected windings $W_{A2}$ and $W_{B2}$ with their ohmic and inductive (leakage) resistances as well as the occasional outer impedance $Z_2$ (Fig. 5) an electrically equivalent substitute circuit diagram (Fig. 6)

can be given, which consists of a winding $W_2'$ free from resistance and leakage, in which the sum E. M. F. $E_2$ is induced, which feeds a outer purely ohmic resistance with the active conductance $\lambda_W$ and parallel thereto an outer pure reactance with the susceptance $\lambda_b$ (inductively positively counted). The active component $J_{2w}$ (positively counted in direction of $E_2$) of the winding current $J_2$ (Fig. 7) is then $$J_{2w} = E_2 \lambda_w \qquad (21)$$

and the reactive component (positively counted in the lagging direction)

$$J_{2b} = E_2 \lambda_b \qquad (22)$$

As can be derived from Fig. 7, the real power of the winding $W_{A2}$ as inner product of the vectors $E_{A2}$ and $J_2$ is $$N_{A2} = m_2 E_{A2} [E_{A2} \lambda_w + E_{B2} (\lambda_w \cos \epsilon - \lambda_b \sin \epsilon)] \quad (23A)$$

and that of the winding $W_{B2}$ ($m_2 \ldots$ secondary loop number)

$$N_{B2} = m_2 E_{B2} [E_{B2} \lambda_w + E_{A2} (\lambda_w \cos \epsilon + \lambda_b \sin \epsilon)] \qquad (23B)$$

The active power actually destroyed in the windings $W_{A2}$ and $W_{B2}$ as well as in the occasionally connected outer impedance $Z_2$ is $$N_2 = N_{A2} + N_{B2} = m_2 E^2{}_2 \lambda_w \qquad (24)$$

and in the case of opposite signs of $N_{A2}$ and $N_{B2}$ can be appreciably smaller in amount, as these partial outputs, even (at $\lambda_w \to 0$) practically disappear in relation to them (pure active output transport from one part winding to the other).

Since each of the pairs of windings $W_{A1}$, $W_{A2}$ and $W_{B1}$, $W_{B2}$, considered for itself alone, is subjected to the laws of asynchronous drives, the moved body receives through the force action of the travelling field $\phi_A$ on the winding $W_{A2}$ a mechanical power (positively counted in the driving direction)

$$N_{KA} = P_A \cdot V_K = N_{A2} \frac{f_A - f_{A2}}{f_{A2}} \qquad (25A)$$

and through the force action of the travelling field $\phi_B$ on the winding $W_{B2}$ a mechanical output $$N_{KB} = P_B \cdot V_K = N_{B2} \frac{f_B - f_{B2}}{f_{B2}} \qquad (25B)$$

There result from the Equations 1A, 3A and 25A and 1B, 3B and 25B respectively the forces corresponding to the part powers and tangent to the path (counted positively in the positive direction of movement):

$$P_A = \frac{N_{A2}}{2 \tau_A f_{A2}}, \qquad (26A)$$

$$P_B = \frac{N_{B2}}{2 \tau_B f_{B2}} \qquad (26B)$$

and the drivingly and brakingly acting sum respectively of these forces is:

$$P = P_A + P_B = \frac{N_{A2}}{2 \tau_A f_{A2}} + \frac{N_{B2}}{2 \tau_B f_{B2}} \qquad (27)$$

It is seen from the Equations 23A, 23B and 27 that the total force P exerted by the two travelling fields $\phi_A$ and $\phi_B$ on the body 1 moved with the synchronous velocity $v_K$ tangentially to its path is generally composed according to $$P = P_c + P_s \qquad (28)$$

of the two partial forces $$P_c = \frac{m_2 \lambda w}{2} \left[ \frac{E^2{}_{A2}}{\tau_A f_{A2}} + \frac{E^2{}_{B2}}{\tau_B f_{B2}} \right] \qquad (29)$$

and $$P_s = \frac{m_2 E_{A2} E_{B2}}{2} \left[ \lambda_w \left( \frac{1}{\tau_A f_{A2}} + \frac{1}{\tau_B f_{B2}} \right) \cdot \cos \epsilon - \lambda_b \left( \frac{1}{\tau_A f_{A2}} - \frac{1}{\tau_B f_{B2}} \right) \cdot \sin \epsilon \right] \qquad (30)$$

Since the partial force $P_s$ is thus a sine function of the angle $\epsilon$ increased by a phase angle, that is according to Equation 17 also a sine function with the period $2\tau_s$ of the moved body to the reference system, it exerts, capable of positive and negative values, an accelerating or retarding effect, that is synchronizing effect on this body. As can be seen from Equation 30 the force $P_s$ is always present, in so far as at least one of the two conductances $\lambda_w$, $\lambda_b$ and both secondary electromotive forces $E_{A2}$, $E_{B2}$ differ from zero. The latter calls for $$|f_{A2}| = |f_{B2}| \neq 0$$

which can be fulfilled even at standstill of the body 1. (Then it is true $v_K = 0$, but a force $P_A$ determining the position of the body within a path section $2\tau_s$ is present, which is indicated in the following by the term "synchronous standstill"). For $v_K = 0$, that is $f_S = 0$, then according to the Equations 18, 19 there applies for the primary frequencies $$f_{A,0} - \frac{f_{A2}}{f_{B2}} \cdot f_{B,0} = 0 \qquad (31)$$

thus $$|f_{A,0}| = |f_{B,0}| = f_0 \qquad (32)$$

and, since allotted primary and secondary frequencies are equal to each other in size and direction in the standstill, also $$|f_{A2,0}| = |f_{B2,0}| = f_0 \qquad (33)$$

Contrary to the known synchronous machines, the alternating current windings must be fed with the frequency 0, that is with direct current, for achieving a "synchronous standstill," in the drive according to the invention it is only necessary for this purpose that the difference between the amounts $|f_A|$, $|f_B|$ of the two travelling field frequencies $f_A$, $f_B$ becomes nil. If at least one of these two frequencies $f_A$, $f_B$ starts to deviate, beginning from the synchronous standstill, from its standstill value $f_0$, the body is set synchronously in motion, with a velocity, which is proportional to the existing difference between the amounts of the said frequencies. If the actual travelling field frequencies are according to $$f_A = f_{A,0} + \Delta f_A \qquad (34A)$$

$$f_B = f_{B,0} + \Delta f_B \qquad (34B)$$

referred to their standstill value (according to magnitude and direction) then there results for the actual "synchronizing frequency" determining $v_K$ (vide Equations 18, 19):

$$f_s = \Delta f_A - \frac{f_{A2}}{f_{B2}} \cdot \Delta f_B \qquad (35)$$

By suitable dimensioning of the amount of the standstill frequency $f_0$ and of the pole pitch ratio $T_A/T_B$ (vide Equations 16 and 19) therefore any widely extendable range of the synchronous velocity $v_K$ (including standstill and, if necessary, also reversal of the direction of movement) can be driven through, without even only one of the travelling field frequencies $f_A$, $f_B$ having to pass through zero or approach zero. In practice this affords the important advantage that as a rule it is sufficient for the controlling of any wide range, to produce those frequencies, which should be variable, with a speed-variable synchronous machine, or with a speed-variable asynchronous machine (acting as frequency convertor); that therefore no commutating machines are necessary. There follows from the Equations 31, 34A and 34B $$f_{B2}=f_{B2,0}+\left(\frac{\Delta f_B}{\tau_A}-\frac{\Delta f_A}{\tau_B}\right)\cdot \tau_s \quad (36)$$

If in operation the two travelling field frequencies are changed in relation to their standstill value (fundamentally already the alteration of one frequency alone is sufficient for the alteration of $v_K$) according to Equation 35, namely always in the order $$\frac{\Delta f_B}{\Delta f_A}=\frac{\tau_A}{\tau_B} \quad (37)$$

it is seen from Equation 36 that when the two secondary frequencies (slip frequencies) retain unaltered their standstill amount $f_0$ at all speeds. This results in the velocity independence of the substitute conductances $\lambda_w$ and $\lambda_b$ (Fig. 6) as well as (under the presumption of constant useful travelling fields $\phi_A$ and $\phi_B$) of the electro-motive forces $E_{A2}$ and $E_{B2}$, that is also according to the Equations 29 and 30 velocity independence of force P or its limiting values (pull-on values), which is advantageous for many uses of the drive according to the invention. Of course a velocity dependence of the force P can be achieved, for example by suitable alteration, in amount and sign, of the magnitudes no longer able to be fulfilled occurring in the Equation 37.

For the sake of completeness it may be pointed out that in addition to the "synchronous standstill" there are also other synchronous operation conditions, in which the two travelling field frequencies are equal according to amount, that is $|f_A|=|f_B|$. The relation of the two frequencies has then the reversed sign, as in the synchronous standstill (it is then according to Equation 18 $|f_S|=|2f_A|=|2f_B|$) so that for reaching this operational point by synchronous starting from the standstill at least one of these frequencies must pass through zero, which can be realized, for example, by commutator machines in the circuit of the respective primary winding.

The non-synchronizing partial force $P_0$ (Equation 29) in so far as it would have a suitable magnitude or direction at a given use of the drive according to the invention or would be disturbing and in the last named case is not made to disappear practically through $\lambda_w \to 0$, can be influenced at will in its action on the moved body by adding an also non-synchronizing additional force $P_Z$. (Vide Figs. 10, 11, 13.) This force can be produced in different ways, known per se, mechanically as well as electromagnetically, in the latter case, for example, by an additional asynchronous drive or also by such a braking of the moved body. For the asynchronous production of such an additional force one of the travelling fields already provided for the drive according to the invention can be co-used occasionally, in so far as it has the relative direction of movement in relation to the moved body corresponding to the desired direction of $P_Z$, that is in so far as the respective slip frequency has the sign of $P_Z$. In this case also no additional secondary winding is necessary, on the contrary it is sufficient to connect a resistance of suitable magnitude in parallel to the secondary winding $W_{A2}$ or $W_{B2}$ disposed in the respective travelling field. The said winding then conducts not only current $J_2$ common to the two windings but an additional current $J_{2Z}$, which—connected with only one travelling field—supplies the desired additional force $P_Z$. Finally, two drives according to the invention acting on the moved body can also be provided in such a manner that their synchronizing partial forces are supported and their non-synchronizing partial forces are superposed in a desired way, preferably acting counter to each other or cancelling (Example 3).

Up to now both primary windings were presumed stationary, as was mentioned at the beginning for simplifying the representation. Now, as is well known the absolute velocity ($v_A$ or $v_B$) of a travelling field can be composed by addition of its relative velocity as against its primary winding ($W_{A1}$ or $W_{B1}$) and of the absolute velocity $v_{WA}$ and $v_{WB}$ respectively of this winding, without this effect on a given secondary winding ($W_{A2}$ and $W_{B2}$ respectively) at given slip frequency ($f_{A2}$ and $f_{B2}$) being in any way influenced, the drive according to the invention can also operate with moved primary windings. All derived relations apply further in that the magnitudes $f_A$ and $f_B$ coinciding up to now with the feed frequencies of the primary windings are now generally interpreted as absolute frequencies of the travelling fields $\phi_A$ and $\phi_B$, that is as those frequencies, which these fields have relative to a stationary reference system, for example induce in an (imagined) stationary winding. The frequencies $f_{A1}$ and $f_{B1}$, with which the now moved primary windings $W_{A1}$ and $W_{B1}$ are to be fed, in order to impart to the two travelling fields the absolute frequencies $f_A$ and $f_B$, are connected with the latter according to the Equations 1A and 1B, according to $$v_A=2\tau_A f_A=2\tau_A f_{A1}+v_{WA}$$
$$v_B=2\tau_B f_B=2\tau_B f_{B1}+v_{WB}$$

that is the primary winding frequencies are generally $$f_{A1}=f_A-\frac{v_{WA}}{2\tau_A} \quad (38A)$$

and $$f_{B1}=f_B-\frac{v_{WB}}{2\tau_B} \quad (38B)$$

According to the Equations 36A, 38B and 32 and 34A, 34B respectively the drive according to the invention with moved primary windings, even in the case of different sized primary winding frequencies $f_{A1}$, $f_{B1}$ can attain synchronous standstill or in the case of primary winding frequencies of the same amount any synchronous velocity $v_K$. If both primary windings are moved with various velocities of suitable magnitude, then by alteration of at least one of the two velocities, even at $f_{A1}=f_{B1}=$constant$=0$ (pure direct current excitation of both primary windings) any desired range from $v_K$ including the synchronous standstill can be driven through, whereby (with alteration of $v_{WA}$ and $v_{WB}$) even the secondary frequency can be kept constant.

For the special case $$f_{A1}=f_{B1} \ (=\text{const.})$$

and sign. $f_{A2}=$ sign. $f_{B2}$ (Drive according to Equation 5)
$v_{WB}=$const.$=0$ follows from the Equations 38A, 38B, 16, 18 and 19

$$v_K=\frac{v_{WA}}{1-\frac{\tau_A}{\tau_B}}$$

It is seen from this that with the drive according to the invention in the case of equal-frequency feed of the primary winding (for example rigid frequency) (for example with direct connection) to the supply system a rigid transmission ratio of any magnitude and direction between the velocity of a moved primary winding and that of the moved body can be achieved by suitable selection of the pole pitch ratio $\tau_A/\tau_B$. If both primary windings are moved, their velocities translated in different ratio are superposed on the moved body like a planet gear.

Similar to the previous derivations, it can be shown that also with more than two travelling fields $\phi_A$, $\phi_B$, $\phi_C$ ... of the pole pitches $\tau_A$, $\tau_B$, $\tau_C$ ... and absolute frequencies $f_A$, $f_B$, $f_C$ ..., which jointly influence current paths on each body to be moved and induce in them alternating currents, the frequencies of which have at least in groups equal absolute amounts, a synchronizing action exerted by all these fields can be attained. The synchronizing force $P_S$ is then composed of the partial forces $P_S'$, $P_S''$, $P_S'''$ ... each of which runs sinusoidally over its double synchronizing pole pitch $2\tau_S'$ and $2\tau_s''$, $2\tau_s'''$ respectively . . ., these pole pitches being however generally of different size. The total force $P_S$ then as trigonometric sum does not run sinusoidally with a period $2\tau_s$, $|\tau_s|$ being the smallest common multiple of $|\tau_s'|$, $|\tau_s''|$, $|\tau_s'''|$, . . . In the case of more than three travelling fields moreover the condition according to the invention of the joint action of the secondary current paths and equality of amount of the respective slip frequencies needs to be fulfilled only in groups—at least in pairs. Each of these field groups then has a drive according to the invention for itself, which superposes on the moved body its synchronizing force produced without cooperation of the other field groups. A use of this combination of single drives to give a multiple drive (for the suppression of the non-synchronizing force $P_C$) was already stated (column 9).

Examples (1) Operations are carried out according to Equation 5, by corresponding feeding of the stationary primary windings the effective values of the two secondary electromotive forces are kept equally large ($E_{A2}=E_{B2}$), the secondary windings are constructed so low in leakage (or their leak reactance is substantially compensated by condensers connected in series) that the susceptance goes $\lambda_b \to 0$. The two pole pitches are dimensioned in the ratio $\tau_B/\tau_A=3/2$, the one primary frequence is variable relative to its standstill value $f_0>0$ according to $$f_A=f_0+\Delta f$$

whereas the other remains $f_B=f_0=$const. Then for $\Delta f>0$ is $\tau_s=3\tau_A$ ---------------------- From Equation 16.
$f_s=\Delta f>0$ ---------------------- From Equation 18.
$v_K=6\tau_A \cdot \Delta f>0$ ---------------------- From Equation 19.
$f_{B2}=f_{A2}=f_0-\Delta f$ ---------------------- From Equation 20.

as well as $$P=\frac{5m_2 E_{A2}^2 \lambda_w}{6\tau_A(f_0-\Delta f)} \cdot (1+\cos \epsilon) \gtreqless 0$$

[From Equations 28, 29, 30]

Figure 10:
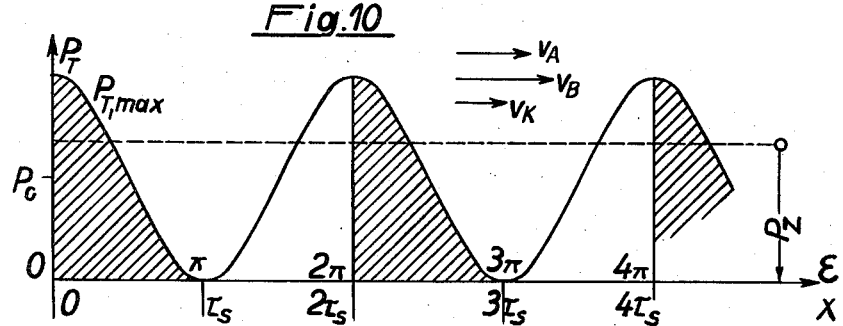

The curve of the total force P, which extends from zero to a driving maximum value $P_{T, max}$ (no brake action) is shown in Fig. 10 above the angle $\epsilon$ characterizing the position relative to the synchronous reference system or over the allotted path length $x$, in which figure the direction of movement of the two travelling fields and of the driven body are also drawn. The stable driving ranges (in which the driving force increases at the lagging of the driven body) are shown by hatching. Also in Fig. 10 is shown how by addition of a (here braking) additional force $P_Z$ the non-synchronizing partial force $P_C$ can be overcompensated (displaced zero line broken).

(2) This example differs from Example 1 only in respect of the primary frequencies, which are both now assumed negative (travelling fields move in opposite direction to Example 1, $f_A=-f_0<0$ remaining=constant, wherein as $f_B=-f_0-\Delta f$. For $\Delta f>0$ then is $\tau_s=3\tau_A$
$f_s=\Delta f>0$
$v_K=6\tau_A\Delta f>0$
$f_{B2}=f_{A2}=-f_0-3\Delta f<0$ and $$P=-\frac{5m_2 E_{A2}^2 \lambda_w}{6\tau_A(f_0+3\Delta f)} \cdot (1+\cos \epsilon) \leqq 0$$

Figure 11:
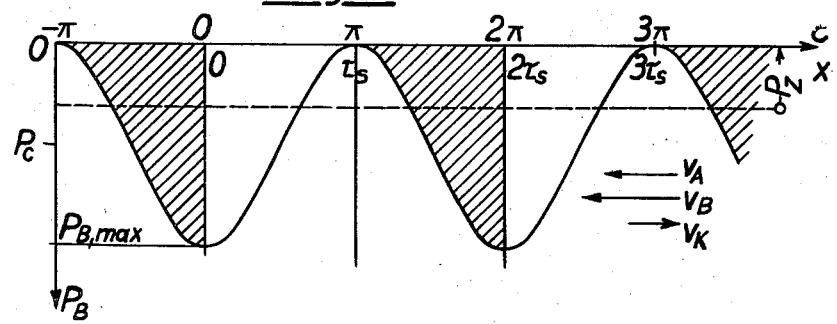

The total force P runs here only brakingly between zero and a maximum value $P_{B, max}$, as shown in Fig. 11; both travelling fields move in opposite direction to the synchronous velocity $v_K$. The stable braking range is shown by hatching. In order also to attain a synchronizing drive action, a (driving) additional force $P_Z$ can be superposed, which results in a correspondingly displaced zero line (broken line). If this additional force is produced, for example, asynchronously by means of a special additional primary winding, it is possible to have it act only for the drive of the moved body, but to disconnect it in the case of undesired braking or even to reverse its direction in order then to have at disposal the double of $P_C$ (Fig. 11) or even more as maximum braking force (through pull). However, in avoiding additional forces, it can be driven for the drive according to Example 1 and only switch over to Example 2 at braking. Since as a comparison of both examples shows, a pair of primary frequency values of the same absolute amounts ($f_0$ and $f_0+\Delta f$) correspond to each $v_K$ value in both cases ($\tau_A$, $\tau_B$ and $f_0$ presumed to be unchanged), that is the difference is present only in the sign and the disposition to the two primary windings, it is sufficient for the change over to exchange the current sources of the two primary windings and in doing so to reverse the phase sequence of their connections (for the purpose of reversing the directions of movement of the travelling fields). In this case it is possible by suitable connection to displace the start of a synchronizing period ($\epsilon=0$, $x=0$) in the braking operation by a pole pitch $\tau_s$ relative to the position while driving (as it is the case in Fig. 11 in reference to Fig. 10), so that the stable working regions retain the same position relative to the synchronous reference system and by this means instabilities or oscillations of the moved body at the change over are avoided.

Figure 12:
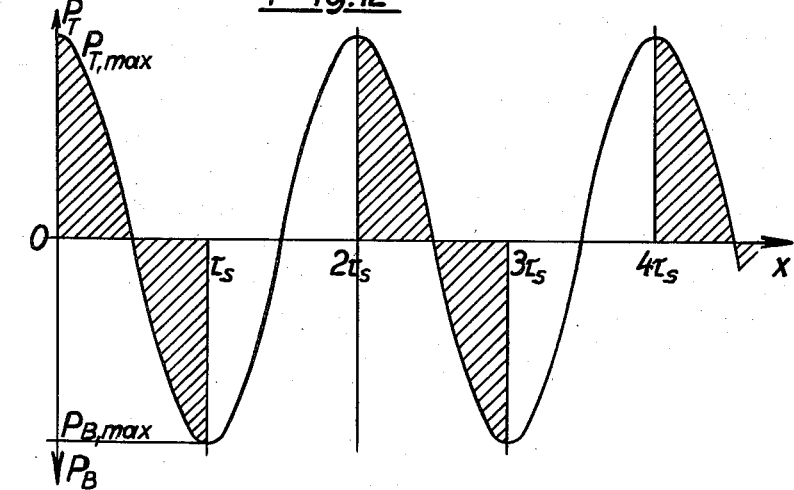
Figure 15:
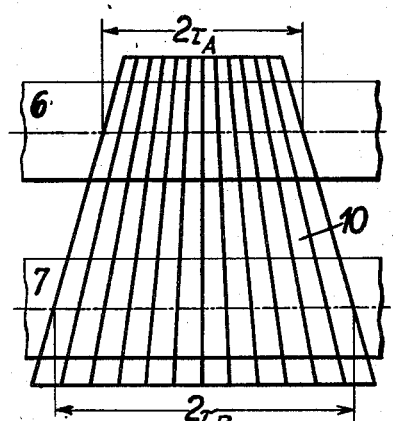

(3) If the two drives according to Examples 1 and 2 are brought to act at the same time on the moved body, their synchronizing forces are superposed—same amplitudes and the relative position shown in Figs. 10 and 11 presumed—according to Fig. 12, whereas the two non-synchronizing partial forces are cancelled. Then the introduction of an additional force $P_Z$ (the two drives can optionally also work with different amplitudes as well as deviations from the shown relative position) as well as the change over from driving to braking are omitted. As can be seen from Examples 1 and 2, the four primary windings of the two drives can be combined in pairs, the winding $W_{A1}$ being then excited with the two frequencies $f_{A1}'=f_0+\Delta f$ and $f_{A1}''=f_0$ and the winding $W_{B1}$ with the frequency pair $f_{B1}'=-f_0$ and $f_{B1}''=-f_0-\Delta f$. Since these four frequencies according to amount are equal in pairs, two current sources connected in suitable manner (for example according to Fig. 24) are sufficient for the feeding of the two primary windings. Of course for these drive combinations also only two secondary windings on the moved body are necessary, which, as will be shown, can be each combined to one single winding occasionally as the two primary windings.

(4) A drive working according to Equation 5 with $E_{A2}=0.25E_{B2}$, $\lambda_b \to 0$, $\tau_B/\tau_A=16$, $f_A=-f_0+\Delta f<0$,
$f_B=-f_0+(\Delta f)/16<0$ gives for $\Delta f>0$:

$\tau_s=15/16 \tau_A$
$f_s=15/16 \Delta f>0$
$v_K=2\tau_A \Delta f>0$
$f_{B2}=f_{A2}=-f_0=$const$<0$ $$P=-\frac{m_2 E_{A2}^2 \lambda_w}{\tau_A f_0} \cdot \left(1+\frac{17}{8} \cos \epsilon\right) \lesseqgtr 0$$

The curve of P as well as the directions of movement of the fields and of the body are shown in Fig. 13. It is remarkable that, differing from Example 2 there is even a region, in which the total force P acts drivingly, although both travelling fields move in opposite direction to the driven body. The maximum value (pull-out value) of the driving force is smaller than that of the braking force, which is advantageous for many applications (for example circular loom) and makes an additional force dispensible.

(5) A drive working according to Equation 8, with any (but differing from zero) values of the electro motive forces $E_{A2}$ and $E_{B2}$ and with ohmic resistances negligibly small compared to the reactance, in the secondary circuit, that is $\lambda_w \to 0$, with a pole pitch ratio $\tau_B/\tau_A=2$ and the primary frequencies $f_A=f_0+\Delta f>0$ and $$f_B=-f_0+\tfrac{1}{2}\Delta f<0$$

which feed the stationary primary windings, has at $\Delta f>0$ the following characteristic magnitudes $$\tau_s = \tfrac{2}{3}\tau_A$$
$$f_s = \tfrac{3}{2}\Delta f > 0$$
$$v_K = 2\tau_A \Delta f > 0$$
$$f_{B2} = -f_{A2} = -f_0 = \text{const.} < 0$$

and $$P_C = 0$$

$$P = P_s = -\frac{3m_2 E_{A2} E_{B2} \lambda_b}{4\tau_A f_0} \cdot \sin \epsilon$$

The force P runs, as in the Example 3 (Fig. 12) symmetrically to the zero line, but this curve is attained here already by one driving system alone and without additional force $P_Z$.

Primary as well as secondary windings can, as is shown in Figs. 1 to 4, be constructed as coil windings also locally separate from each other with individual iron bodies. The secondary windings (for example the separated coil windings $W_{A2}$ or $W_{B2}$ on individual iron bodies 8 or 9 of the moved body 1 in Figs. 3 and 4), are then to be connected together in multi-phase construction in correct pole sequence, so that a common current path is produced for the secondary current $J_2$ effecting the synchronization. The simplest connection of this kind, which therefore, as stated at the beginning, was also used for the explanation of the method of working, is the series connection of the individual associated winding loops of $W_{A2}$ and $W_{B2}$, the circuit of each loop pair can be closed for itself (open multiphase system) or in interlinked connection (for example star connection according to Figs. 3 and 5). As can be easily proved, the single loops of each secondary winding can also be combined for itself to an interlinked multi-phase system, however, without affecting the method of working according to the invention, these interlinking connections of the secondary windings being able to deviate from each other (for example $W_{A2}$ in delta connection, $W_{B2}$ in zig-zag connection) and then these two interlinked winding systems can be connected together.

Since it is well known a short-circuit cage with $m$ cage rods per pair of poles represents a short-circuit m-phase single rod winding, the two secondary windings $W_{A2}$ and $W_{B2}$ can also be combined to form one short-circuit cage 10 disposed on the moved body according to Fig. 14. The single cage rods 11 are combined by the star connections $12_A$, $12_B$ to a multi-phase system closed in itself. The part $11_A$ of each cage rod situated opposite to the stator 6 and connected with the field $\phi_A$ with the primary winding forms a conductor and at the same time a loop of the secondary winding $W_{A2}$, whereas the other rod part $11_B$ forms that conductor and loop of the winding $W_{B2}$ which is connected in series with $11_A$. In order to achieve a complete and symmetrical multi-phase system the single cage rods 11 are bent between the two stators 6 and 7 in such a manner that the cage 10 extends relative to the primary winding $W_{A1}$ over its double pole pitch $2\tau_A$ (or an integral multiple thereof) and relative to the primary winding $W_{B1}$ over $2\tau_A$ (or the same multiple as above). The secondary electro-motive forces $E_{A2}$ and $E_{B2}$ then have for all cage rods the same effective values and the same relative phase positions, which are given by the angle $\epsilon$ (Fig. 7). The latter is also still the case if the cage construction according to Fig. 14 is replaced by that according to Fig. 15 (cage with converging rods). Only the effetcive values of $E_{A2}$ and $E_{B2}$ then alter a little from rod to rod (with the rod sloping factor), but this is practically of no importance.

If the pole pitches $\tau_A$ and $\tau_B$ of the primary winding do not differ all too much from each other, the cage 10 forming the two secondary windings $W_{A2}$ and $W_{B2}$ can be constructed according to Fig. 16 with parallel rods, that is with constant width. This width reaches preferably over a mean value $2\tau_M$ situated between $2\tau_A$ and $2\tau_B$. Here the effective values of $E_{A2}$ and $E_{B2}$ respectively are, it is true, again equally large for all rods, but the relative phase position of these electro-motive forces alter from rod to rod, that is the vector $E_{B2}$, as is shown in Fig. 17 runs through a (hatched) relative position region with the opening angle $\beta$, the limiting positions of the vector being determined by the two outermost cage rods. For the actual magnitude and direction of the total force P exerted on the moved body the central position of the vector $E_{B2}$ plotted in Fig. 17 is the deciding factor. The outer rods participate somewhat less in the production of this force P than the inner ones. If the cage rods, as shown in Fig. 18, are inclined (which of course is possible also in cages according to Figs. 14 and 15, in the latter case by an additional unidirectional sloping superposed on the converging rod arrangement), the undesired slot harmonica can be decreased on the one hand by known manner or cancelled (this can also be achieved by slot sloping of the stator windings), on the other hand the result is a force $P_N=P \tan \gamma$ normal to the path, the construction of which in case of necessity can be influenced by suitable selection of the slope angle $\gamma$ so that it is superposed on the other path-normal forces, especially the weight or the centrifugal force of the moved body in advantageous manner. The angle $\gamma$ can be so dimensioned, for example as shown in Fig. 18, that in the normal operations, that is when the tangential force P has the same direction as the velocity $v_K$ of the body 1, $P_N$ acts against the weight G of this body in a selectable extent, by which means a relief and preservation of the corresponding part of the mechanical guidance of 1 and thus a decrease of the resistance to movement caused by friction is produced. At the braking its direction also changes on account of the reversal of P and PN is added now to the weight G, so that the braking effect of P is effectively supported by the path friction corresponding to the sum of forces $(P_N+G)$. Similar effects can also be attained by correspondingly inclined secondary coil windings. In drives according to the invention with more than two primary windings, which act on common secondary current paths, these can also be formed by a short-circuit cage, for instance in a logical development of the examples of construction according to the Figs. 14, 15, 16.

Having regard to the space requirements, weight and constructional costs of a drive according to the invention it is often preferable to superpose the primary windings, at least partly, that is to connect them in series magnetically, for example by arrangement on a common iron body, so that also the travelling fields caused by them are correspondingly superposed. In this case it is frequently necessary and in any case advantageous to prevent or to make ineffective a mutual induction of the primary windings fed with different frequencies, in order to prevent the penetration of voltages of foreign frequency into the primary circuit. The mutual induction of the primary windings can be made to disappear or at least be greatly reduced by measures known per se, such as suitable selection of the pole pitch ratio, coil chord, loop interweaving, suitable numbers of loops, width of zone and interlinking circuits. These measures can be replaced or supplemented by an arrangement of a so-called uncoupling transformer, for which Fig. 19 shows an example for the case of two superposed mutually inducing primary windings $W_{A1}$ and $W_{B1}$ and being induced mutually. The uncoupling transformer 13 has two winding systems $W_{EA1}$ and $W_{EB1}$, which are connected in series with the associated windings so that the former is induced in opposite direction as the latter (on account of opposite relative phase position of the winding currents), with which the mutual induction of the whole system $W_{A1}$, $W_{EA1}$ and $W_{B1}$, $W_{EB1}$ can be made to disappear.

In order to make the expenditure necessary for the uncoupling useful for the drive itself, the windings of the uncoupling transformer 13 (Fig. 19) can be substituted by the mutually superposed primary windings at least of a second drive system according to the invention, which are connected in series with the windings $W_{A1}$ and $W_{B1}$ to be uncoupled, but locally separated from them are arranged in such a changed relative position, that they are induced in opposite direction to $W_{A1}$, $W_{B1}$. The above explained uncoupling of the primary current circuits with foreign frequency by primary series connection of at least two driving systems can be achieved by the simplified and space-saving construction of the primary windings according to Fig. 20. Here the primary windings of both systems to be connected in series are formed from the same winding elements (coils)—the series connection is thus done already in each single coil conductor—each of which extends over the primary iron bodies 14 and 15 of both systems. In the space between these two iron bodies the coils are bent (sheared) in such a manner that the relative position of the windings $W_{A1,2}$ and $W_{B1,2}$ superposed on the iron body 15 differs from the relative positions of the windings $W_{A1,1}$ and $W_{B1,1}$ superposed on the iron body 14 to the extent necessary for the uncoupling. Since for the alteration of the relative position it depends only on the sum of the sheared paths $s_A$ and $s_B$, but it is preferable to do this on both in order to keep the distance between both iron bodies 14 and 15 as small as possible or by means of additional shearing in same direction of both coil groups to attain a desired relative position of the current paths relevant to the two driving systems on the moved body.

The above explained uncoupling measures can, properly extended, be applied to drives according to the invention with more than two primary windings acting on common secondary current paths. The superpositionings of the primary windings $W_{A1}$ and $W_{B1}$ and that of the travelling fields necessitates also at least a superposing of the relevant secondary windings ($W_{A2}$, $W_{B2}$) on the moved body. It is often preferable to superpose these windings not only connected together according to the invention (for example to arrange them in the same slots of a secondary iron body), but to combine them to form one common secondary winding $W_2$ simultaneously induced by the superposed travelling fields, which is either short-circuited or connected to external impedances $Z_2$ (similar to Fig. 5).

If the drive according to the invention operates according to Equation 8, that is with travelling fields advancing in opposite direction relative to the moved body, this results in separately arranged secondary windings of opposite phase sequence, which has to be taken into consideration in connecting together these windings to common current paths. If such travelling fields are superposed and moreover of equal pole pitch, then multi-phase secondary windings, which are associated, also superposed and connected in series according to their correct time, that is locally oppositely directed phase sequence, produce the same effect as a single phase winding and can therefore be combined in such a winding, that is substituted by it. A short-circuited combined winding $W_2$ can be formed also by a short-circuit cage, for example according to Fig. 16 or 18 (the separated iron bodies 6, 7 are then to be imagined replaced by an iron body taking up in common the superposed primary windings. Since in this case, owing to the superposing of the inducing travelling fields an at least partly joint action of the secondary current paths is then also given, if the course of these current paths is not forced by the shape and position of the single cage rods, it is fundamentally sufficient already to arrange a conductive body ("eddy current plate") not subdivided into cage rods and end connections, that is geometrically undetermined for the attainment of the driving effect according to the invention.

Figure 21:
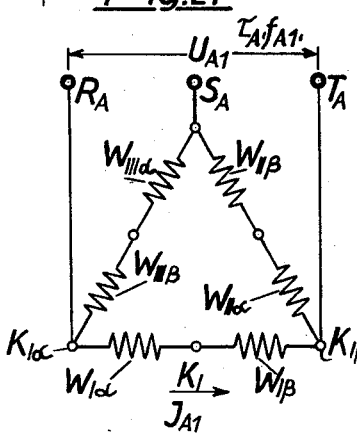
Figure 22:
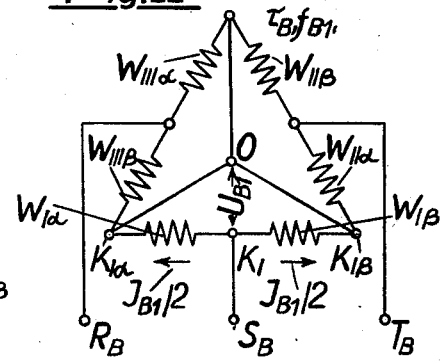

By a construction like the known pole change windings the effect of several superposed primary windings $W_{A1}$, $W_{B1}$ fed with different frequencies $f_{A1}$, $f_{B1}$ and having different pole pitches $\tau_A$, $\tau_B$ can be attained with a multi fed primary winding. Figures 21, 22, 23 explain an example of the combination of two primary windings with the pole pitch ratio $\tau_B/\tau_A=2$. A primary winding constructed like the known so-called Dahlander winding was applied in the delta connection according to Fig. 21 to the terminals $R_A$, $S_A$, $T_A$ of a three-phase current source with the interlinked voltage $U_{A1}$ and frequency $f_{A1}$, a travelling field of this frequency and the pole pitch $\tau_A$ produced. The same winding in double delta connection according to Fig. 22 was applied to the terminals $R_B$, $S_B$, $T_B$ of another three phase current source with the loop voltage $U_{B1}$ and the frequency $f_{B1}$ gave a travelling field of the pole pitch $\tau_B=2\tau_A$ corresponding to this frequency. As is well known these different pole pitches in such a winding are produced in that in one case (pole pitch $\tau_A$, Fig. 21) current flows through the two specially constructed and disposed coil groups of each winding strand (for example $W_{1\alpha}$, $W_{1\beta}$) in the same direction (current $J_{A1}$) in the other case (pole pitch $\tau_B$, Fig. 22) however in opposite direction (current $J_{B1}/2$). By multiple feeding of such a winding a superposition of these two cases and thus the combination of the single effects can be attained according to Figs. 21 and 22. This multiple feeding can be realized, for example without mutual influencing of the current source of different frequency by the fact that the three loops I, II, III of the Dahlander winding are not connected with each other according to Figs. 21, 22, but are fed separately and independently from each other, that is by open three phase systems. As can be seen from Figs. 21 and 22, each of the three winding loops (for example loop I) is to be fed for itself alone in such a way that the voltage $U_{A1}$ of the frequency $f_{A1}$ is to be applied to the two outer terminals ($K_{I\alpha}$, $K_{I\beta}$) and at the same time the voltage $U_{B1}$ of the frequency $f_{B1}$ is applied to its central terminal ($K_I$) and an artificial zero point O, the voltage pair $U_{A1}$, $U_{B1}$ having of course to be displaced in phase from loop to loop electrically by 120°. Fig. 23 shows a circuit of such a multiple feeding for a loop ($W_{1,I}$) of the combined primary winding. The voltage $U_{A1}$ of the frequency $f_{A1}$ is supplied, for example, by a frequency converter (vide Fig. 24 for example of embodiment for such a one), the primary winding 17 of which (shown only single looped) lies on the network terminal (supply system voltage $U_N$, network frequency $f_N$) and whose secondary winding loop feeding the winding loop $W_{1,I}$ through the terminals $K_{I\alpha}$ and $K_{I\beta}$ consists of the two halves 18, 19, each of which supplies the part voltage $$\frac{U_{A1}}{2}$$

The connecting point of these two winding halves conducted out to the terminal $O_I$ represents therefore in respect to the systems $U_{A1}$, $f_{A1}$ a zero point, which compared with the central terminal $K_I$, which also constitutes a halving point for the voltage $U_{A1}$, has no voltage of the frequency $f_{A1}$. Now the loop 22 of the frequency converter 20 supplying the voltage $U_{B1}$ of the frequency $f_{B1}$ is connected between the terminals $O_I$ and $K_I$, the primary winding 21 of which frequency converter (shown only single looped) lies, for example, on the same supply system as that of the frequency converter. The current supplied by the winding 22 branches off at $K_I$ into two halves, which (also as in Fig. 22) flow through the two coil groups $W_{I\alpha}$ and $W_{I\beta}$ in opposite directions and return to the winding 22 through the winding halves 18, 19. These two winding halves are now preferably disposed (for example wound over each other) so that the magnetic effects of the current halves $J_{B1}/2$ also flowing through them oppositely are cancelled out, with which the current source 16 remains uninfluenced by the currents $J_{B1}$ having a frequency foreign to it. The current $J_{A1}$ supplied by 18, 19 does not flow at all through the two coil groups $W_{I_\alpha}$ and $W_{I_\beta}$ in the same direction (as also in Fig. 21) and the winding 22, so that also the current source 20 remains free from frequency-foreign influences. The other loops ($W_{1,II}$, $W_{1,III}$) of the combined primary winding are fed in the same manner by the corresponding secondary winding (not shown) loops of the frequency converters 16 and 20. The primary winding loops of each of these converters can, of course, be connected in any connection. If the control of the synchronous velocity $v_K$ is done by alteration of only one of the two frequencies $f_{A1}$, $f_{B1}$, that is the other can be kept constant (vide Examples 1 and 2) and especially equal to the supply frequency $f_N$, then in the place of the associated frequency converter in Fig. 3 a stationary transformer of similar connection can be used. The frequency converters can also be replaced by generators.

The frequency-foreign superposed primary windings of equal pole pitch, stationary relative to each other, can easily be combined to form one common winding, which then are to be fed with two or more frequencies. A simple possibility of multi-frequency feeding is then given by phase-correct series connection of the respective current sources supplying the single frequencies.

Single frequencies however can also be excited in a synchronous generator, which is excited at least additionally with alternating current of at least one frequency. It is occasionally possible, as in the circuit example according to Fig. 23 to prevent a disturbing influence on current sources connected in series by the frequency-foreign currents flowing through them without additional uncoupling measures, as the circuit diagram according to Fig. 24 shows. The same is a circuit for the double drive according to Example 3 produced by the superposition of two single drives according to the invention. As will be seen from the explanation of this example each of the two primary windings $W_{A1}$, $W_{B1}$ already forms the above shown combination of two windings and is to be fed with two frequencies namely—under the condition that the standstill amount $f_0$ of the primary frequencies is set equal to the given supply frequency amount $f_N$—the winding $W_{A1}$ being fed with the frequencies $f_N$ and $(f_N + \Delta f)$ and the winding $W_{B1}$ being fed with the frequencies $-f_N$ and $-(f_N + \Delta f)$. The variable frequency is supplied by a frequency converter 16, which, for example, is constructed like an asynchronous machine, in which case here, for the saving of slip rings—the interlinked primary winding (not shown in Fig. 24; in Fig. 23 reference 17) is disposed in the rotor 23 and connected through the slip ring 24 to the supply system, whereas the secondary windings 18, 19 are disposed in the stator. The rotor 23 is driven with a speed $n_K$—in direction of rotation of the rotary field relative to 23, counted positively. In the secondary winding of 16 the frequency $(f_N + \Delta f)$ is induced therewith, the deviation $\Delta f$ of which from the stand still value $f_N$ is according to magnitude and sign proportional to the speed $n_K$. Now, since the synchronous velocity $v_K$, as given in the Examples 1 and 2, alters proportionally with $\Delta f$, $v_K$ according to magnitude and direction, is proportional to the actual speed $n_K$ of the frequency converter. Each loop of the un-interlinked secondary winding of 16 again consists of the winding halves 18 and 19, the points of connection of which are connected to the supply system in correct phase. Thus the winding halves 18 supply currents $J_{A1}'$ of the secondary frequency $(f_N + \Delta f)$ and the supply currents $J_{A1}''$ of the frequency $f_N$ to the primary winding $W_{A1}$. The primary winding $W_{B1}$ relatively to $W_{A1}$ is connected with exchanged loops, which gives an opposite direction of movement of their travelling fields and is formally expressed by negative sign of the relevant frequencies. $W_{B1}$ accordingly receives from the winding halves 19 currents $J_{B1}''$ of the frequency $-(f_N + \Delta f)$ and from the supply currents $J_{B1}'$ of the frequency $-f_N$. From the fact that (vide Fig. 24) in reference to the windings $W_{A1}$ and $W_{B1}$ the frequency convertor currents $J_{A1}'$ and $J_{B1}''$ flow in the same direction, the supply currents $J_{A1}''$ and $J_{B1}'$ on the other hand flow in opposite direction, it follows, as can be derived from the Equations 17 and 30, that the synchronizing periods of the two single drives have the relative position according to Figs. 10 and 11, so that their superposition gives the desired force curve according to Fig. 12. By means of suitable layout of the windings $W_{A1}$, $W_{B1}$ and of the relevant secondary windings $W_{A2}$, $W_{B2}$ connected together according to the invention on the moved body it is possible to keep the currents $J_{A1}$ and $J_{B1}''$ at least approximately equally great and of equal phase in reference to the secondary windings 18, 19 and also the currents $J_{A1}''$ and $J_{B1}'$ approximately in equal magnitude and phase in reference to the network. Then, as can be seen from Fig. 24, no or no appreciable frequency-foreign currents flow through the supply system, whereas the supply currents flowing oppositely through the winding halves 18, 19 are practically cancelled out in respect to their effect on the frequency convertor 16. The windings $W_{A1}$ and $W_{B1}$ can also be superposed or combined to form one single winding. The latter is then, similar to the example shown in Figs. 21, 22 and 23, to be constructed like one of the pole changeable windings known per se in the ratio $\tau_B/\tau_A = 3:2$.

The construction of the secondary windings on the moved body in the case of combined primary windings is done according to the same points of view as with the superposed ones.

For those primary winding current circuits the frequency of which is variable for the purpose of control of the synchronous velocity $v_K$, any current sources of suitable capacity and frequency are suitable, that is an existing supply system (for example according to Fig. 24), which may be connected through transformers, as well as generators or convertors set up especially. Generally multi-phase current sources are suitable for attaining travelling fields necessary for the drive according to the invention, but in some cases also single phase current sources and phase splitting in the windings of the drive itself according to the invention are sufficient, for example in the known kind used in single phase asynchronous motors. For the feeding of those primary windings or primary winding connections, whose frequency should be variable for the control of the synchronous velocity $v_K$, either frequency convertors or special generators come into question. Asynchronous machines as well as commutator machines can be used as frequency convertors. The first named machines are superior in respect to simplicity and operating safety and give a voltage practically proportional to frequency, with which a far-reaching frequency-dependence of the magnitude of the travelling fields produced by the connected primary windings is attainable. These convertors, however, do not make it possible, as it can be desired in some cases, (vide column 6) to feed primary windings with the frequency zero. For this purpose commutator machines are suitable, which in addition can be so constructed in known way that their voltage output remains independent of frequency or also—for example by step-less variability with the aid of double sets of brushes—is indirectly made dependent on frequency in desired manner. A further advantage of such machines is that with them the frequency conversion of electric active power is possible without taking up or giving off mechanical power (which occurs fundamentally in asynchronous convertors). In using frequency convertors for the control of $v_K$ it is preferable to feed these convertors, as also the primary windings of the drive to be operated with invariable frequency from a common current source, for example a supply system or generator as is shown in the Figs. 23 to 28. Then it can always be attained that synchronous velocity depends only on the speed or speeds of the frequency convertors (for example $n_K$ in Fig. 24) and remains free from an undesired influencing by occasionally occurring fluctuations of the supply frequency or generator frequency $f_N = F_0$ (see Equations 31 to 35 and Examples 1–5). If these frequency convertors are replaced by speed-variable synchronous generators the drive of these generators can be carried out through adding gears (revolving gears). In this case the actual speed of a generator is composed of a basic speed and an additional speed superposed on it and variable for the control of the synchronous velocity $v_K$. If the basic speeds of the generator are kept in suitable, rigid relation mutually to the frequency $f_N$ of a supply system also feeding the drive synchronously or—if no connection to a supply system is present—by any common drive, then any influence of fluctuations of the supply frequency or alterations of speed of the common drive supplying the basic speeds on the synchronous velocity $v_K$ are avoided.

If the primary windings of the drive according to the invention or at least one of the same are made movable, the frequencies, with which these windings are fed, can, as already shown, be equal and invariable together. If the feeding is done from a common current source, here also an independence of the actual synchronous velocity $v_K$ on the frequency fluctuations of this current source can be attained with it. In the drive according to the invention those speeds or velocities (speeds of frequency convertors, additional generator speeds, primary winding velocities), by whose variability the synchronous velocity linearly dependent on them should be controlled, are most simply derived by direct coupling or through gears with rigid transmission ratio of those parts of the system, the movement of which just produces the synchronous reference system of the plant. For example if in the case of circular looms the velocity of rotation of the shed formation, with which the moved bodies (shuttles) must remain synchronous, is given by the actual speed of the so-called main shaft of the loom, so that here by a slip-free and rigid ratio derivation of the above named velocities determining $v_K$, for example speeds of the frequency convertor, the synchronism of the shuttle is attained in all operating conditions. If the control of the shuttle velocity is carried out by movement of a primary winding, for example winding $W_{A1}$, the revolution velocity $v_{WA}$ of the winding can be limited to such small values by a correspondingly high transmission ratio $v_K/v_{AW}$ (vide columns 7 and 8), that the mass effect of the moved parts (of the winding and its iron body) remains of no importance, other than in the case of the known coupling drives.

The direct taking of the electric energy necessary for the drive according to the invention, made without additional devices, from an existing supply system gives, it is true, a simple construction of the plant, but has two disadvantages: on the one hand primary windings and convertors have to be adapted to the actually given values of voltage and frequency, owing to which the plants are made more expensive, on the other hand in the case of standstill caused by a supply failure the stopping or the braking of the moved bodies does not then take place synchronously, which is frequently unallowable especially in circular looms. The last named disadvantage can be avoided by devices which are connected in parallel to the plant to the supply system, and in the case of supply failure act automatically as substitute current source. Such a substitute current source can be formed by a synchronous machine connected permanently in parallel and provided with a sufficient working load, which in normal operation runs with no load or as wattless current generator, but at the disconnection of the supply system comes in its place as generator, which then feeds the drive according to the invention from its stored kinetic energy and by this means maintains the synchronism of the moved bodies up to their standstill. Instead of such a synchronous machine a condenser can be used, as shown in Fig. 24. The condenser 26 in normal operations serves for the compensation of the wattless current of the drive according to the invention and therefore with the input reactance of the same is tuned to be at resonance at the supply frequency. If the disturbed supply system is separated, for example by the switch 25, this condenser with the said input reactance forms a resonant circuit, which now swings out with approximate supply frequency, the active energy demand of the synchronous drive being taken from the power content of this resonant circuit until the standstill of the drive. An energy content of the resonant circuit sufficient for the short braking time is attainable by corresponding magnitude of the capacity of the condenser 26 and of the input susceptance of the driving plant, in some cases, increased by choke coils connected in parallel. However, it is most suitable to do without any direct connection of the drive according to the invention to the supply system and to feed this from a special generator, which is provided with sufficient flywheels and is driven through a free-wheel coupling of an engine of any kind. At an interruption of the generator drive here again the further feeding of the synchronous drive is ensured up to the standstill of the moved bodies by the kinetic energy of the flywheel. In addition, all parts of the plant with exception of the generator drive are then independent of the existence or of the kind of a connection to a supply system, which in the case of series production of the drive for a certain purpose (for example of circular looms) permits a uniform construction of the same.

The generator can in some cases be substituted by a converter (for example asynchronous converter fed from a direct current system) and the free-wheel coupling can be replaced by an equivalent electric device, which, in case of disturbance, prevents a back-feed into the supply system feeding the converter (for example blocking cells on the direct current side of the synchronous converter).

In the place of one generator there can as already shown earlier, be two or more generators, while partially or completely omitting the frequency converters, on which generators the additional speeds serving for the control of the synchronous velocity are superposed through revolving gears, whereas the basic speeds are taken from a common flywheel, which is driven in normal operations through a free-wheel coupling by a motor of any kind.

As normally only a part of the whole path and thus always only a part of the primary winding elements are covered by the secondary windings of the moved body, that is the other part of these winding elements is not connected, this produces on the one hand a corresponding wattless power demand of these windings and on the other hand the high leakage voltage drop gives correspondingly low maximum value (pull-out value) of the synchronizing force, and generally an undesired load dependence of the useful field strength and thus of the pathnormal magnetic attractive forces exerted on the moved bodies. Fig. 25 shows an example for a circuit for the compensation of the primary winding leakage inductances including their undesired effects. For the sake of clarity, as also in Figs. 26 to 28, only one loop of each winding is shown. To each loop of the primary winding $W_{A1}$, which is fed from a supply system or another current source of the voltage $U_N$ and the invariable frequency $f_N$, a condenser 27 is connected in series, which is so dimensioned that its capacitative voltage drop cancels the leakage voltage drop of the winding $W_{A1}$. Since the supply frequency $f_N$ is practically constant, this compensation is maintained in all operating conditions. The primary winding $W_{B1}$ is fed by the secondary winding 22 of the asynchronous frequency converters 20 with the variable frequency $f_{B1}$. If a condenser is also connected in series with the winding $W_{B1}$, this would give compensation of the leakage inductance only for a certain value of the frequency $f_{B1}$. In order to avoid this drawback the compensation is placed into the primary circuits of the frequency converter 20, which is practically of constant frequency. In parallel to the primary winding 21 of this converter a condenser 28 is connected, which with the inductance of this winding gives resonance at the frequency $f_N$, that is forms a blocking circuit. By this means in the no-load condition of the converter no current at all is taken up by this together with the condenser 28 (in neglecting the electrically covered no-load losses), whereas at loading the primary supply current $J_{BN}$ is proportional and referred to the converter, in counter phase to the secondary current $J_{B1}$. The leakage voltage drop caused by the latter in the windings 22 and $W_{B1}$ is proportional to the product $(J_{B1}f_{B1})$. Reduced to the primary side this corresponds, as it is a matter of an asynchronous machine, to a voltage drop proportional to the product $(J_{BN}f_N)$, which is practically compensated by a condenser 29, through which $J_{BN}$ flows, together with the primary leakage voltage drops in all operating conditions on account of $f_N$=const. Thus in this circuit the E. M. F. induced in the winding 22 is increased by the effect of the condenser 29 in relation to its no-load value by the actual secondary leakage current drop, that is the winding $W_{B1}$ behaves in respect to current take up and magnitude of the useful travelling fields produced by it, as if it and the frequency converter 20 were free from leakage and the latter primarily directly connected to the network. Thus the useful travelling fields of the winding $W_{B1}$ remain independent of frequency and load. If the winding $W_{A1}$ should not be fed from the network, as shown in Fig. 25, but also by a frequency converter, then the same circuit can be used for it as for the winding $W_{B1}$. Of course part- or over-compensation of the leakage voltage drops is also possible with this circuit.

Fig. 26 gives a circuit example for transformer series connection of the frequency-foreign primary windings $W_{A1}$ and $W_{B1}$. The asynchronous frequency converter 20 feeding the winding $W_{B1}$ with variable frequency is compensated as in Fig. 25 in regard to its no-load current by the condenser 28 disposed in parallel to the primary winding 21. The current $J_N$ taken from the supply system and having the supply frequency $f_N$ is therefore again proportional and in counter phase to $J_{B1}$. Since the primary winding $W_{A1}$ is connected in series with the primary side of the frequency converter, its current $J_{A1}$ is identical with the supply current $J_N$ that is also related to $J_{B1}$. The condenser 30 combines the functions of the condensers 27 and 29 in Fig. 25, that is it compensates the leakage voltage drops of the two primary windings $W_{A1}$ and $W_{B1}$ and of the frequency converter 20 in all operational conditions to the desired extent.

In Fig. 27 a circuit for the transformer-series connection of the two primary windings $W_{A1}$ and $W_{B1}$ is explained for the case in which both windings are to be fed with variable frequencies. The winding $W_{B1}$ is again fed from the secondary winding 22 of its asynchronous frequency converter 20, the primary winding of which is in respect to the no-load wattless current is compensated by the parallel condenser 28. The asynchronous frequency converter 31 feeding the winding $W_{A1}$ by means of the secondary winding 33 receives the resonance condenser 34, working similarly to 28, parallel to its primary winding 32. The two converter—primary current circuits 21, 28 and 32, 34 of the converters are applied in series to the supply system through the condenser 35, thus conduct the same supply system current $J_N$. As this supply system current, according to the above statements according to magnitude and phase position, is connected to the winding current $J_{A1}$ as well as—independently thereof—to the winding current $J_{B1}$, these two winding currents must remain in all conditions of operations proportional to each other and, referred to the primary side of the converters, of equal phase, although they generally have frequencies, which are dissimilar and independently variable from each other (owing to the speed of the associated converter). The condenser 35 compensates, independently of the actual secondary frequencies, the leakage voltage drops of all windings. That the mutual dependence of the currents $J_{A1}$ and $J_{B1}$ actually correspond to a connection in series, is made clear by the following extreme case: If, for example, the winding $W_{A1}$ is disconnected, that is the current $J_{A1}$ is made to disappear, the primary winding 32 with the condenser 34 forms a blocking circuit, which bars the current $J_N$ and takes up the whole supply voltage $U_N$. With this the converter 20 becomes without current, by which the current $J_{B1}$ also disappears, as if its own circuit (winding $W_{B1}$) had been opened.

The transformer-series connection, explained by means of examples of Figs. 26 and 27, of two, in some cases also more frequency-foreign primary windings of the drive according to the invention result, on the one hand, in saving of condensers for the compensation of the leakage voltage drops, and on the other hand, it can also be attained that a mutual inductive influence of these windings—at superposition or combination of the same—remains practically ineffective without special uncoupling measures in reference to the primary side of the converters and the network. Finally, by means of the enforced proportionality of the primary winding currents $J_{A1}$, $J_{B1}$ ... a common dependence of these currents on the primary winding frequencies $f_{A1}$, $f_{B1}$ ... can also be achieved, for which an example is shown in Fig. 28. The two frequency converters 20 and 31 are connected in the same way as in Fig. 27, but the condenser 35 is omitted and the two windings $W_{A1}$ and $W_{B1}$ are provided with additional frequency-dependent series resistances, which, for example for $W_{A1}$ are formed by the condenser 38 and for $W_{B1}$ by the condenser 36 and the choke 37 connected in parallel. By suitable magnitude and frequency-dependence of these series resistances it can, for example be attained without difficulty that the two winding currents $J_{A1}$ and $J_{B1}$ and thus also the travelling fields produced by them increase with the difference $(f_{A1}-f_{B1})$, that is also with the velocity $v_K$ of the moved body. Then there rise with this velocity on the one hand the pull-out values of the synchronizing force and on the other hand the path-normal magnetic attractive forces exerted by the travelling fields on the moved body. The latter can be utilized, for example, advantageously in the case of a curved path for reducing the centrifugal force effect of the moved body also increasing with the velocity.

The path-normal magnetic attractive forces acting on iron parts of the moved body can be used to relieve the path of the body from other path-normal forces, for example the weight and especially of the centrifugal force of the body. The last named relief is especially important in the case of circular looms (Figs. 1 and 2), in order not to scrape the warp threads surrounding the shuttle 1, or not to displace them from their proper position. Naturally the attractive forces may not be much stronger that the counteracting centrifugal forces, as otherwise the same disadvantageous effect occurs on the inside of the shuttle path. It is therefore best to limit the resultant of the magnetic attractive forces to a suitable value of constant magnitude and direction, but it is still more advantageous to adapt them automatically to the actual centrifugal force at all velocities. In the case of non-superposed or combined windings, that is if the respective travelling fields enter independently of each other at various points into the iron part of the moved body associated with them any magnitude and direction can be imparted to the resultant of their magnetic attractive forces. For example, if in the arrangement of the iron bodies 6 and 7 respectively receiving the primary windings $W_{A1}$ and $W_{B1}$ respectively, shown in Fig. 1, in which the useful travelling fields $\phi_A$ and $\phi_B$ enter at opposite sides into the moved body 1 and find their backfeed in the iron bodies 8 and 9 (Fig. 3), the part attractive forces originating from the two fields act against each other, the total force can be made to disappear completely by suitable layout or be restricted to a difference value directed radially inwards or outwards. If, on the other hand, the travelling fields enter on the same side or—in the case of superposing—on the same side into the moved body, they are naturally supported in respect to the magnetic attractive force action. As shown in Fig. 29, the attractive force of travelling fields, for example of the field produced by the primary winding $W_{A1}$ disposed in the grooves of the iron body 6 can be reduced in that the iron body 8 receiving the secondary winding $W_{A2}$ and disposed on the moved body produces, owing to saturation, only a partial feed back (broken force line) for the field, so that the other part of the field (full force line) finds its back feed in an iron core to be counted to the primary part 39 separated from 8 by an air gap and preferably stationary. With this an attractive force arises between the feed back core 39 and the iron body 8, which acts against that occurring between the iron bodies 6 and 8. The saturation in the back of the iron body 8 can also be supplemented or replaced by arrangement of non-magnetisable intermediate layers (air gaps) in this back. The further development of the last named measure leads to the construction shown in Fig. 30: The iron body 8 of Fig. 29 is here replaced by single teeth 40, which are preferably laminated and not ferromagnetically joined together. The travelling fields, here for example, superposed (primary windings $W_{A1}$, $W_{B1}$ disposed jointly in the grooves of the iron body 6), comes out of the moved body again penetrating to a small part the spaces between the teeth transversely to find their feed back in the core 39. By the shaping of the teeth of 6 and of the teeth 40 given in Fig. 30—the latter widened on side facing 6, tapered on the opposite side—it can be attained that the magnetic force lines density in the air gap between the teeth 40 and the feed back core 39, as diagrammatically indicated, is considerably higher for the most part than in the air gap between 40 and 6. Since the attractive force exerted by a given magnetic flux is proportional to the square of the density of the lines of force, with which this enters or emerges, not only a cancelling, but even a reversal of the total attractive force—this runs then in the direction to the core 39—can be attained by the arrangement according to Fig. 30. Figs. 31 and 32 show another construction of the iron body, with which the last named action can be achieved to an increased extent. As is seen from Fig. 31, a preferably laminated core 39 is again provided for the back feed for the travelling fields, which in this case produced, for example by the common winding $W_1$ disposed on the iron body (combination of two primary windings somewhat according to Fig. 23). The teeth 40 forming the magnetic leads for the passage of the travelling fields through the moved body are in this case, contrary to Fig. 31, laminated parallel to their spaces receiving the secondary winding, by which their cross-section reduction can be achieved in the direction from 6 to 39 by corresponding decrease of their path-normal extent according to Fig. 32. With this a larger proportion of the densities of the lines of force of both air gaps can be attained than in the construction according to Fig. 30, on the one hand, and on the other hand this kind of lamination of the teeth 40 also makes difficult the feed back of a part of the travelling fields inside the moved body (from tooth to tooth) opposing the described influencing of the attractive force. The current paths of the moved body in the arrangement shown here are preferably formed as short-circuit cages (for example according to Fig. 16), the cage rods 11 (Figs. 30, 31) debouching into the star-connections 12 (Fig. 32) lying between the teeth 40. If these cages are made in castings, namely cast around the teeth 40, this gives a simple and compact construction of the driving parts of the moved bodies. A possibility for the complete avoidance of magnetic attractive forces consists in keeping the moved body free from field-conducting iron parts, that is, for example, to leave out the teeth 40. This, however, results in a very great take-up of wattless power of the primary windings on account of the considerable reluctance of the spaces between the iron bodies 6 and 30 necessitated by the space demands of the secondary current paths, which restricts the possibility of using this measure. In those special cases, in which the wattless energy demand plays only a secondary part, the back feed core 39 can be omitted in addition, in some cases even the iron body of the primary windings themselves, that is the drive can be effected by the travelling fields closing in the air space around the primary windings and at this connected with the secondary windings, which results in a generally slight electro-dynamic repulsion between the primary windings and the moved body.

As shown in Fig. 33 on an example (circular loom) path-normal forces $P_N$ (here concentric) can be achieved by means of the magnetic attractive forces, which forces $P_N$ run vertically to the main direction of these attractive forces (here radial) caused by the arrangement of the iron bodies and windings. This can be effected by conical construction of the one iron body (39) or in supplementing or as substitute of this measure by axial displacement of the iron parts of the moved body (shuttle) 1 receiving the fields relative to the central plane of the associated cylindrical iron body (6). With this, for example, a relief of the path from the weight of the body 1 can be attained, which then—contrary to the effect of the sloping of the secondary current paths according to Fig. 18—can be kept independent of the existing magnitude and direction of forces being tangent to the path. If the primary windings are fed by frequency-proportional voltages, which for example in the case of asynchronous frequency converters of constant primary voltage and frequency result by itself, and in addition the leakage voltage drops in the current circuit of these windings compensated independent of frequency (for example according to Fig. 25), the travelling fields and thus also the magnetic attractive forces remain independent of the existing velocity and load of the drive.

If a dependance on frequency of the magnetic forces, for example an adaptation to the existing centrifugal forces of the moved body is necessary, this can be achieved either by means known per se for the alteration of the voltage in the primary current circuit (for example rotary or slide transformers, rapid regulation in the exciter circuit of the synchronous generators, commutators, frequency converters, especially with sets of double brushes, variable resistances), which are controlled in dependence on the existing synchronous velocity, or directly by suitable primary winding circuits with resistances independent of frequency (for example according to Fig. 28), however, since it is advantageous to make the travelling fields of the drive not or only slightly variable having regard to simplicity and operating safety (for example in reference to the pull-out values of the forces being tangent to the path) the magnetic forces serving for relieving the path or adaptation to the existing centrifugal forces can be caused also wholly or partially by additional fields, not serving for the drive, acting preferably on special iron parts of the moved body.

The pulsations of the magnetic attractive forces occurring in some cases, which can cause disturbing oscillations of the moved body, great mechanical wear and noise development, are to be diminished or wholly eliminated, according to their cause, by the following means: the so-called slot pulsations known from electric machines can be made harmless in known manner by suitable relative values of the primary and secondary slot pitches as well as sloping of the slots. The latter is effective against harmonics of tangential force.

A travelling field, which without superposing with another one, enters a secondary iron body, which also as the respective secondary winding extends in tangential direction over the double of the pole pitch or a whole number multiple of the same, give indeed a magnetic attractive force, which according to amount remains time constant, the point of application of which oscillates, however, in direction tangential to the path. By arrangement of two or more secondary iron bodies wound independently of each other, which in reference to the respective travelling field have suitable local phase displacement, a cancellation of these oscillations at the point of application can be attained in respect to the resultant of the single attractive forces.

Superposed travelling fields of different pole pitch and/or, according to magnitude or direction, of different slip frequency (for example slip frequency difference according to Example 3 in circuit according to Fig. 24) give interference oscillations in respect to the magnitude of the attractive forces exercised jointly by them. These oscillations can be decreased by relative sloping of the primary and secondary current paths (sloping of the slot) as well as by arrangement of additional secondary iron parts, which are unwound or differently wound (gives phase displacement of the components of the interference oscillations). A complete cancellation of such oscillations can be attained by multiple drive, that is arrangement of several independently wound secondary iron parts, which in respect to the travelling fields superposed on and coupled to them, have a suitable phase displacement of the interference oscillations. This phase displacement can be achieved by unequal pole pitches or by local (e. g., shearing of the winding elements similar to Fig. 20) or time relative phase displacement (separate feeding of the primary windings) of the travelling fields of the single part drives to be superposed.

With those forms of construction or arrangements of the iron bodies, which make it possible to make the resultant magnetic attractive force to disappear (for example according to Figs. 1, 30, 31, 32) also the pulsations of the attractive force can be suppressed.

What we claim is:

1. An electromagnetic synchronous drive for moving at least one body having at least one current path at a predetermined speed along a predetermined path, characterized by primary means comprising at least one ferromagnetic part and operable to produce at least two elementary magnetic travelling fields having predetermined velocities and adapted to induce in at least one current path of each of said bodies at least two currents the amounts of the frequencies of which are related to the actual speed of said body and are equal to one another when said body is moving at said predetermined speed.

2. A drive as set forth in claim 1, in which said elementary magnetic travelling fields have predetermined pole pitches and said predetermined velocities and pole pitches of said travelling fields and said frequencies of said currents when said body is moving at said predetermined speed are related according to the equation $$v_K = \frac{v_A}{1 - \frac{f_{A2}}{f_{B2}} \times \frac{\tau_A}{\tau_B}} + \frac{v_B}{1 - \frac{f_{B2}}{f_{A2}} \times \frac{\tau_B}{\tau_A}}$$

where $v_K$ is said predetermined speed, $v_A$ and $v_B$, respectively, are said predetermined velocities of said two travelling fields, $\tau_A$ and $\tau_B$, respectively, are said predetermined pole pitches of said two travelling fields, and $f_{A2}$ and $f_{B2}$, respectively, are the frequencies of the currents induced by said two travelling fields in said current path when said body is moving at said predetermined speed.

3. A drive as set forth in claim 1, in which said primary means comprise at least two separate parts each of which is operable to produce at least one of said magnetic travelling fields, at least one of said parts being movable to control the velocity of the travelling field produced by said part.

4. A drive as set forth in claim 1, in which said current path comprises two series-connected parts each of which is arranged to have one of said currents induced therein by one of said travelling fields and which drive comprises a resistor shunting one of said series-connected parts.

5. A drive as set forth in claim 1, in which at least one of said bodies comprises at least two of said current paths and a common winding connecting said two current paths.

6. A drive as set forth in claim 1, in which the current paths on at least one of said bodies are formed by a cage winding.

7. A drive as set forth in claim 1, in which said current path of at least one of said bodies is a common current path arranged to have said currents induced therein by both said travelling fields and each of said travelling fields has a predetermined pole pitch, the extent of said common current path in the direction of movement of said body being equal to twice the mean pole pitch of said travelling field.

8. A drive as set forth in claim 1, in which said primary means comprise magnetically coupled windings and uncoupling transformers connected in series with said windings.

9. A drive as set forth in claim 1, which comprises at least two individual drives, spaced from each other each of which individual drives comprises primary means having superimposed windings, said drive further comprising means for feeding said primary means with current of the same frequency.

10. A drive as set forth in claim 9, which comprises common winding elements forming part of said primary means of at least two of said individual drives, whereby owing to shearing of at least a number of these winding elements the relative positions of the same are different in each of said individual drives to which they belong.

11. A drive as set forth in claim 1, in which said primary means comprise windings associated with each of said travelling fields and having parts common to all said windings, and which comprises means for feeding said windings with currents of different frequencies.

12. A drive as set forth in claim 1, in which at least one of said bodies is provided with a common current path arranged to have said currents induced therein by at least two of said travelling fields and constructed to operate as a single phase winding.

13. A drive as set forth in claim 1, which comprises a synchronous generator and means for exciting said generator with alternating current, and in which said primary means comprises a winding connected to said generator.

14. A drive as set forth in claim 1, in which said primary means comprise windings having at least parts in common and connected as a change-pole winding and means for multi-feeding said common parts in open loop connection.

15. A drive as set forth in claim 1, in which said primary means comprise windings and which comprises frequency converters connected to said windings and having two loops each, a plurality of shunt condensers each of which shunts one of said loops of at least one of said converters, and a plurality of series condensers each of which is series-connected to one of said loops shunted by said shunt condensers, said condensers being adapted to at least partially compensate any leakage voltage drop in said windings connected to said frequency converters having condenser-shunted loops.

16. A drive as set forth in claim 1, in which said primary means comprise first and second windings and which comprises frequency converters having a primary side connected in series with each other and with said second windings and a secondary side connected to said first windings.

17. A drive as set forth in claim 16, in which said first and second windings are connected in transformer series connection and which comprises a frequency-dependent resistor in circuit with said windings, whereby the currents in all said windings are dependent on the frequency of the circuit which includes said resistor.

References Cited in the file of this patent

UNITED STATES PATENTS

| | | |
|---|---|---|
| 1,881,014 | Ayers | Oct. 4, 1932 |
| 2,135,373 | Wilson | Nov. 8, 1938 |
| 2,214,297 | Ferry | Sept. 10, 1940 |
| 2,666,879 | Godsey et al. | Jan. 19, 1954 |